US010607485B2

(12) United States Patent
Gupta et al.

(10) Patent No.: US 10,607,485 B2
(45) Date of Patent: Mar. 31, 2020

(54) SYSTEM AND METHOD FOR COMMUNICATING A MESSAGE TO A VEHICLE

(71) Applicant: SONY CORPORATION, Tokyo (JP)

(72) Inventors: Manish Gupta, Bengaluru (IN); Pralay Kumar Pal, Bengaluru (IN); Ramesha Chelur Ramachandra Sastry, Bengaluru (IN); Pramod Chintalapoodi, San Diego, CA (US); Sho Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 535 days.

(21) Appl. No.: 14/938,052

(22) Filed: Nov. 11, 2015

(65) Prior Publication Data
US 2017/0132922 A1 May 11, 2017

(51) Int. Cl.
G06F 3/048 (2013.01)
G08G 1/0962 (2006.01)
(Continued)

(52) U.S. Cl.
CPC .......... G08G 1/0962 (2013.01); B60K 35/00 (2013.01); G06F 3/0482 (2013.01);
(Continued)

(58) Field of Classification Search
CPC .................................................. G06F 3/0482
See application file for complete search history.

(56) References Cited

U.S. PATENT DOCUMENTS 5,905,434 A 5/1999 Steffan et al.
8,886,386 B2 11/2014 Merk
(Continued)

FOREIGN PATENT DOCUMENTS

EP 2375393 A1 * 2/2011 .......... G08G 1/0965
EP 2830341 A1 1/2015
(Continued)

OTHER PUBLICATIONS

Carcam Technology, Eagle View Surround 360—Car Reverse Camera system, Aug. 4, 2014, YouTube, https://www.youtube.com/watch?v=zbXLH3BllyE.*
(Continued)

Primary Examiner — Mohamed Abou El Seoud
(74) Attorney, Agent, or Firm — Chip Law Group

(57) ABSTRACT

Various aspects of a system and method for communication of a message to a vehicle are disclosed herein. The system comprises one or more circuits in an electronic control unit (ECU) of a first vehicle that is communicatively coupled to a display device. The one or more circuits in the ECU are configured to receive a video stream and control display of a plurality of image frames in the video stream on the display device. Vehicle information of one or more vehicles, included in an image frame of the plurality of image frames, is received from the one or more vehicles via a wireless network. A first input corresponding to a selection of a vehicle from the one or more vehicles included in the image frame, is received. Vehicle information associated with the selected vehicle is identified. A second input that corresponds to a selection of an information item to be communicated to the selected vehicle, is received. The selected information item is communicated to the selected vehicle.

23 Claims, 15 Drawing Sheets

(51) Int. Cl.
  *B60K 35/00*   (2006.01)
  *G08G 1/04*    (2006.01)
  *H04L 29/08*   (2006.01)
  *H04N 7/18*    (2006.01)
  *G06F 3/0482*  (2013.01)
  *G06F 3/0484*  (2013.01)
  *G06F 3/0488*  (2013.01)
  *G08G 1/017*   (2006.01)
  *G08G 1/0965*  (2006.01)
  *G08G 1/09*    (2006.01)
  *G08G 1/0967*  (2006.01)
  *G08G 1/16*    (2006.01)
  *G08G 1/054*   (2006.01)

(52) U.S. Cl.
  CPC .......... *G06F 3/0484* (2013.01); *G06F 3/0488* (2013.01); *G08G 1/017* (2013.01); *G08G 1/04* (2013.01); *G08G 1/093* (2013.01); *G08G 1/0965* (2013.01); *G08G 1/096741* (2013.01); *G08G 1/096775* (2013.01); *G08G 1/096783* (2013.01); *G08G 1/096791* (2013.01); *H04L 67/12* (2013.01); *H04N 7/183* (2013.01); *B60K 2370/1438* (2019.05); *B60K 2370/152* (2019.05); *B60K 2370/186* (2019.05); *B60K 2370/21* (2019.05); *G08G 1/054* (2013.01); *G08G 1/096716* (2013.01); *G08G 1/096725* (2013.01); *G08G 1/167* (2013.01)

(56) References Cited

U.S. PATENT DOCUMENTS

| | | | |
|---|---|---|---|
| 2003/0081127 A1* | 5/2003 | Kirmuss | B60R 11/02 348/207.99 |
| 2004/0148090 A1 | 7/2004 | Melen | |
| 2006/0214783 A1 | 9/2006 | Ratnakar | |
| 2010/0001967 A1* | 1/2010 | Yoo | G06F 3/0488 345/173 |
| 2011/0153186 A1* | 6/2011 | Jakobson | G01C 21/20 701/532 |
| 2013/0088600 A1 | 4/2013 | Wu et al. | |
| 2016/0191795 A1* | 6/2016 | Han | G06T 3/4038 348/36 |

FOREIGN PATENT DOCUMENTS

| | | |
|---|---|---|
| JP | 2002-024994 A | 1/2002 |
| JP | 2004-280645 A | 10/2004 |
| JP | 2014-035582 A | 2/2014 |
| JP | 2015-176464 A | 10/2015 |

OTHER PUBLICATIONS

International Search Report of PCT Application No. PCT/JP2016/082023, dated Dec. 20, 2016, 35 pages.

* cited by examiner

| 302 | 304 | 306 | 308 | | 310 |
|---|---|---|---|---|---|
| Time_Instants | Dataset_1 | Dataset_2 | Dataset_3 | • | Dataset_N |
| T1 | D1 | D2 | D3 | • | Dn |
| T2 | D3 | D4 | D5 | • | |
| T3 | D6 | D7 | D8 | • | |
| • | • | • | • | • | |
| • | • | • | • | • | |
| Tn | D9 | D10 | D11 | | |

300

| Datasets | 324 | 326 | 328 | 330 | 332 | 334 | 336 | 338 | 340 | 342 | 344 | 346 |
|---|---|---|---|---|---|---|---|---|---|---|---|---|
| D1 | ... | ... | ... | ... | ... | ... | ... | ... | ... | ... | ... | ... |
| D2 | ... | ... | ... | ... | ... | ... | ... | ... | ... | ... | ... | ... |
| D3 | ... | ... | ... | ... | ... | ... | ... | ... | ... | ... | ... | ... |
| • | ... | ... | ... | ... | ... | ... | ... | ... | ... | ... | ... | ... |
| • | ... | ... | ... | ... | ... | ... | ... | ... | ... | ... | ... | ... |
| Dn | ... | ... | ... | ... | ... | ... | ... | ... | ... | ... | ... | ... |

SYSTEM AND METHOD FOR COMMUNICATING A MESSAGE TO A VEHICLE

FIELD

Various embodiments of the disclosure relate to communication of a message to a vehicle. More specifically, various embodiments of the disclosure relate to communication of a message to a vehicle by use of a video stream.

BACKGROUND

Advanced applications, such as an intelligent transportation system (ITS), have revolutionized numerous services that relate to vehicular communication systems and traffic management systems. In certain scenarios, a driver of a vehicle may want to communicate with another driver of another vehicle. For example, the driver may want to notify a dangerous situation to the other driver of the other vehicle. However, it may be difficult for the driver to communicate with a driver of a specific vehicle intentionally selected by the driver and notify a specific intention by existing technology, such as honking horns. In another example, a traffic officer may desire to pull over and/or stop a suspect vehicle and follow the suspect vehicle (to be stopped) with flashlights switched on to indicate a pull-over signal. However, the traffic officer may sometimes miss the suspect vehicle. Further, the driver of the suspect vehicle may not instantaneously understand various signals, such as the pull-over signal, and may get into a dilemma of whether to stop or not to stop. Consequently, an enhanced mechanism for a vehicle-specific targeted communication of messages to one or more vehicles may be required, where a confirmation for the receipt of the messages may be solicited.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method to communicate a message to a vehicle substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 3 illustrates an exemplary data structure of a vehicle database for implementation of the disclosed system and method for communication of a message to a vehicle, in accordance with an embodiment of the disclosure.

DETAILED DESCRIPTION

Figure 1:
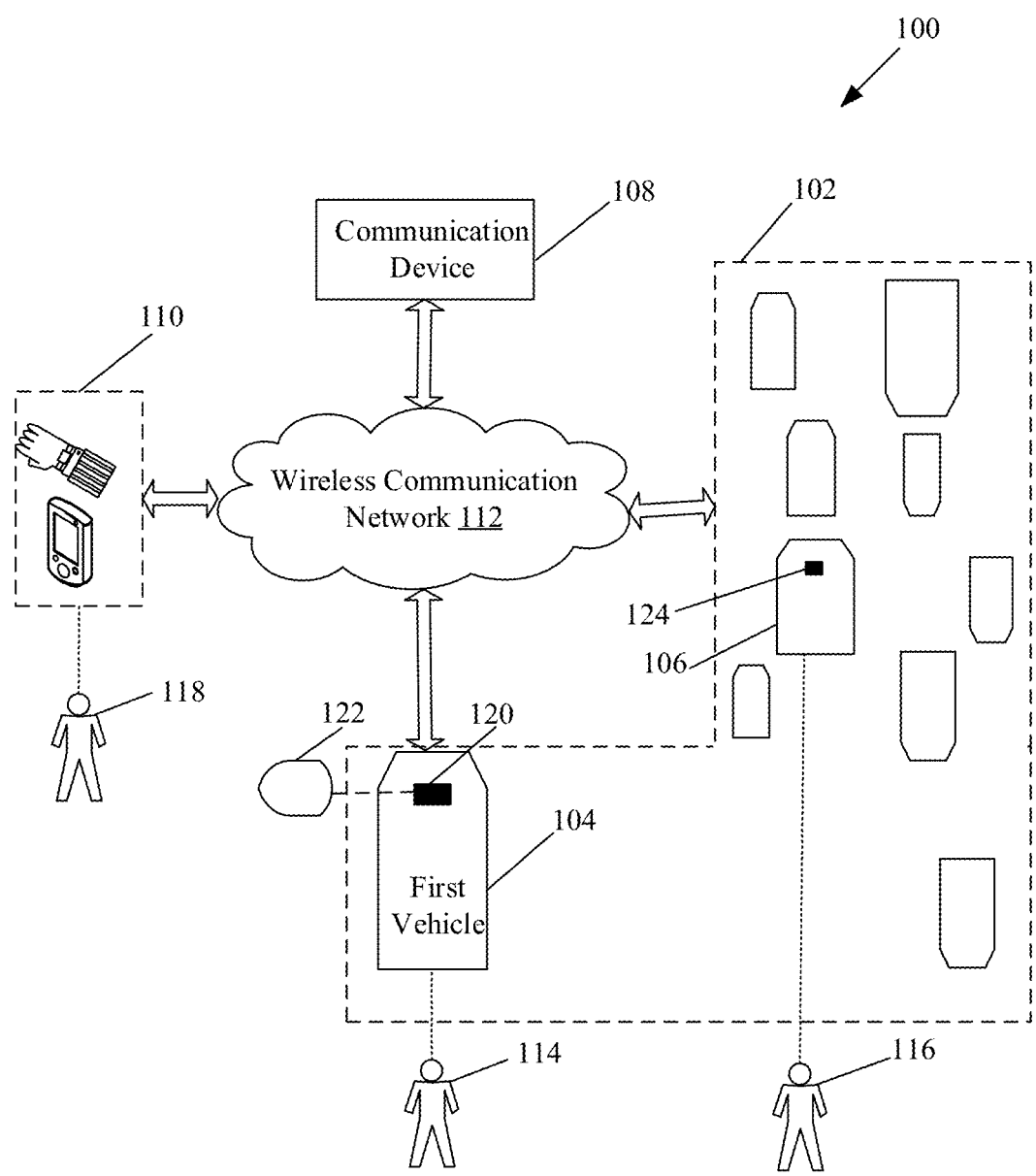
FIG. 1 is a block diagram that illustrates a network environment for communication of a message to a vehicle, in accordance with an embodiment of the disclosure.

The following described implementations may be found in the disclosed system and method for communication of a message to a vehicle. Exemplary aspects of the disclosure may comprise a method that may include receipt of a video stream. A display of a plurality of image frames in the received video stream on the display device may be controlled. Vehicle information of one or more vehicles, included in an image frame of the plurality of image frames may be received from the one or more vehicles, via a wireless network. A first input that corresponds to a selection of a vehicle from the one or more vehicles included in the image frame, may be received. Vehicle information associated with the selected vehicle may be identified. A second input that corresponds to a selection of an information item to be communicated to the selected vehicle, may be received. The selected information item may be communicated to the selected vehicle.

In accordance with an embodiment, the display device may be installed in the first vehicle or installed in a traffic monitoring center (TMC) to remotely monitor traffic of a road portion. In accordance with an embodiment, the display device may be a portable display device.

In accordance with an embodiment, the first input may be a touch operation on an area of the vehicle included in the image frame that is displayed on the display device. In accordance with an embodiment, a plurality of information items that may be communicated to the selected vehicle may be determined based on the identified vehicle information of the selected vehicle. The display of the determined plurality of information items that are selectable by a user on the display device, may be controlled.

In accordance with an embodiment, the video stream and a digital model representation that indicates relative positions of surrounding vehicles in relation to the first vehicle may be displayed together. Highlighted indicia may be placed near the selected vehicle both in the image frame and in the digital model representation when the image frame is touched on an area of the vehicle of the one or more vehicles included in the image frame.

In accordance with an embodiment, an input that corresponds to a selection of one of the plurality of image frames at a first time instant, may be received. The selected one of the plurality of image frames at the first time instant may comprise the one or more vehicles. In accordance with an embodiment, an image-capturing device may be provided that may be configured to capture the plurality of image frames in the video stream within a field-of-view of the image-capturing device.

In accordance with an embodiment, a geospatial position value and/or a direction of the field-of-view associated with the image-capturing device that captures the plurality of image frames, may be determined. In accordance with an embodiment, vehicle information associated with the one or more vehicles at the first time instant may be identified. The identified vehicle information associated with the one or more vehicles that includes the identified vehicle information of the selected vehicle may correspond to a unique vehicle identifier, a vehicle position, a vehicle size, a direction of travel, a vehicle speed value, a steering angle, a vehicle positional accuracy data, a brake system status, a status of a vehicle stability system, yaw rate, a rate of change of speed, lane information, and/or other vehicle parameters.

In accordance with an embodiment, a digital model representation of the one or more vehicles may be generated based on the received vehicle information of the one or more vehicles. The generated digital model representation may indicate afield-of-view of the image-capturing device at the first time instant.

In accordance with an embodiment, one or more datasets that comprises the vehicle information may be received from at least a portion of a plurality of vehicles. The one or more datasets may be received when the portion of the plurality of vehicles are within the field-of-view of the image-capturing device that corresponds to one or more time instants. A vehicle database may be generated based on the received one or more datasets. The received one or more datasets may comprise the vehicle information that corresponds to at least the portion of the plurality of vehicles at the one or more time instants. In accordance with an embodiment, based on the generated vehicle database, the digital model representation of one or more of the captured plurality of image frames may be dynamically generated.

In accordance with an embodiment, a plurality of vehicle parameters that correspond to the received one or more datasets may be dynamically updated in the vehicle database. The update may correspond to the one or more time instants. In accordance with an embodiment, the vehicle information associated with the one or more vehicles at the first time instant may be identified based on filtering of the generated vehicle database. The filtering may occur based on one or more of: a geospatial position value of the image-capturing device, a direction of the field-of-view of the image-capturing device, geospatial information corresponding to a boundary line of an area in the field-of-view at the first time instant.

In accordance with an embodiment, display of the generated digital model representation on the display device may be controlled. The generated digital model representation may comprise a top view of the one or more vehicles in the field-of-view of the image-capturing device at the first time instant. The top view may indicate an arrangement of the one or more vehicles in the generated digital model representation based on the identified vehicle information. The arrangement of the one or more vehicles may correspond to vehicle position, vehicle ordering in one or more lanes, and/or vehicle direction of travel at the first time instant.

In accordance with an embodiment, each of the one or more vehicles in the generated digital model representation may be tagged with a unique vehicle identifier to establish communication with the one or more vehicles. In accordance with an embodiment, a target vehicle from the one or more vehicles may be determined based on selection of the target vehicle from the displayed digital model representation at the display device, in response to a user input.

In accordance with an embodiment, the target vehicle may be determined from the one or more vehicles based on filtering of the identified vehicle information. The filtering may be based on the determined geospatial position value of the image-capturing device, the determined direction of the field-of-view of the image-capturing device, geospatial information corresponding to a boundary line of an area in the field-of-view at the first time instant, and/or one or more threshold values.

In accordance with an embodiment, the information item communicated to the selected vehicle may be a pull-over message, a traffic violation notice, a custom message, and/or a situational message to coordinate with the selected vehicle in a traffic condition. The message may be communicated to the selected vehicle, via a wireless communication channel, one or more road side communication units, a cloud server, or a dedicated short-range communication (DSRC) channel.

FIG. 1 is a block diagram that illustrates a network environment for communication of a message to a vehicle, in accordance with an embodiment of the disclosure. With reference to FIG. 1, there is shown a network environment 100. The network environment 100 may include a plurality of vehicles 102, such as a first vehicle 104 and a second vehicle, hereinafter, referred to as a target vehicle 106. The network environment 100 may further include a communication device 108, a portable device 110, a wireless communication network 112, and one or more users. The users may include a driver 114 (associated with the first vehicle 104), another driver 116 (associated with the target vehicle 106), and a pedestrian 118. There is further shown an electronic control unit (ECU) 120 and a display device 122 in the first vehicle 104. In accordance with an embodiment, the target vehicle 106 may include an ECU 124.

The ECU 120 may be communicatively coupled to the display device 122 of the first vehicle 104. The ECU 120 may be communicatively coupled to the communication device 108, via the wireless communication network 112. The ECU 120 of the first vehicle 104 may be communicatively coupled to the display device 122, via an in-vehicle network (not shown) of the first vehicle 104 or the wireless communication network 112. The first vehicle 104 and the target vehicle 106 may traverse along a road portion. In accordance with an embodiment, the first vehicle 104 may be parked in the vicinity of the road portion. In accordance with an embodiment, the ECU 120 may be replaced by a central processing unit (CPU) of a mobile device, such as a cellular phone or a smartphone, of a user, such as the driver 114, of the first vehicle 104. In such an embodiment, the CPU of the mobile device may communicate with the communication device 108, the portable device 110, and/or the plurality of vehicles 102, via the wireless communication network 112. Further, the CPU of the mobile device may be configured to control display of content on the display device 122 that may be embedded or mounted on the first vehicle 104.

The plurality of vehicles 102 may refer to vehicles that may traverse a road portion that may be monitored for traffic management and control. One or more of the plurality of vehicles 102 may be within a field-of-view (FOV) of an image-capturing device (not shown) situated at the road portion. In accordance with an embodiment, the image-capturing device may be installed at the first vehicle 104. In accordance with an embodiment, the image-capturing device may be coupled to the communication device 108, such as a road-side unit (RSU). The image-capturing device(s) associated with the first vehicle 104 and the communication device 108 may be one of sensors, such as an optical camera, an ultrasound sensor, a radio imaging and ranging (RADAR) unit, a Light detection and ranging (LIDAR) unit, an infrared camera, and/or an infrared RADAR. The plurality of vehicles 102 may comprise the first vehicle 104 and the target vehicle 106. The plurality of vehicles 102 may be communicatively coupled to the wireless communication network 112. One or more datasets of the plurality of vehicles 102 may be provided to the first vehicle 104 and/or the communication device 108.

The first vehicle 104 may comprise the ECU 120, which may be configured to communicate with the communication device 108 and/or other vehicles, such as the target vehicle 106. At least a portion of the plurality of vehicles 102 may comprise one or more ECUs (not shown) that may be configured similar to the ECU 120 of the first vehicle 104.

The target vehicle 106 may refer to one of the plurality of vehicles 102, to which a message is to be communicated. The target vehicle 106 may comprise the ECU 124 that may be configured to communicate with the ECU 120 of the first vehicle 104, the communication device 108, and/or other vehicles. Examples of the plurality of vehicles 102 (which include the first vehicle 104 and the target vehicle 106) may include, but are not limited to, a motor vehicle, a hybrid vehicle, an autonomous vehicle, and/or a vehicle that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources.

The communication device 108 may comprise suitable logic, circuitry, interfaces, and/or code that may be configured to establish a communication channel with one or more vehicles, such as the first vehicle 104 and the target vehicle 106, and/or the portable device 110. The communication device 108 may be pre-installed in the vicinity of the road portion. In accordance with an embodiment, the communication device 108 may include the image-capturing device. The image-capturing device may be configured to capture a plurality of image frames of the road portion within the FOV of the image-capturing device. Examples of the communication device 108 may include, but are not limited to, a mobile unit, an infrastructure unit, such as a road side unit (RSU), and/or other wireless communication devices.

The portable device 110 may comprise suitable logic, circuitry, interfaces, and/or code that may be configured to display a plurality of image frames of the road portion. The plurality of image frames may be captured by the image-capturing device or an inbuilt camera of the portable device 110. The portable device 110 may further communicate with one or more vehicles of the plurality of vehicles 102, and/or the communication device 108, via the wireless communication network 112. Examples of the portable device 110 may include, but are not limited to, a smartphone, a smart-glass, a smart-watch, and/or other computing devices associated with the pedestrian 118.

The wireless communication network 112 may include a medium through which the first vehicle 104 may communicate with the communication device 108, and/or one or more other vehicles, such as the target vehicle 106. Examples of the wireless communication network 112 may include, but are not limited to, a dedicated short-range communication (DSRC) network, a mobile ad-hoc network (MANET), a vehicular ad-hoc network (VANET), Intelligent vehicular ad-hoc network (InVANET), Internet based mobile ad-hoc networks (IMANET), a wireless sensor network (WSN), a wireless mesh network (WMN), the Internet, a cellular network, such as a long-term evolution (LTE) network, a cloud network, a Wireless Fidelity (Wi-Fi) network, and/or a Wireless Local Area Network (WLAN). Various devices in the network environment 100 may be operable to connect to the wireless communication network 112, in accordance with various wireless communication protocols. Examples of such wireless communication protocols may include, but are not limited to, IEEE 802.11, 802.11p, 802.15, 802.16, 1609, Worldwide Interoperability for Microwave Access (Wi-MAX), Wireless Access in Vehicular Environments (WAVE), cellular communication protocols, Transmission Control Protocol and Internet Protocol (TCP/IP), User Datagram Protocol (UDP), Hypertext Transfer Protocol (HTTP), Long-term Evolution (LTE), File Transfer Protocol (FTP), ZigBee, EDGE, infrared (IR), and/or Bluetooth (BT) communication protocols.

The ECU 120 may comprise suitable logic, circuitry, interfaces, and/or code that may be configured to identify vehicle information associated with one or more vehicles. The one or more vehicles from the plurality of vehicles 102 may correspond to vehicles that are within the FOV of the image-capturing device at the time of capture of the FOV. The ECU 120 may be configured to access sensor data from a sensing system of the first vehicle 104. The sensor data may be accessed by the ECU 120 via an in-vehicle network, such as a vehicle area network (VAN), and/or in-vehicle data bus, such as a controller area network (CAN) bus. The ECU 120 may be configured to receive datasets associated with the plurality of vehicles 102, via a wireless communication system (described in FIG. 2) of the first vehicle 104. The ECU 120 may be configured to communicate with external devices, such as the portable device 110, the communication device 108, or other communication devices, via the wireless communication system. The communication may occur by use of the wireless communication network 112. In accordance with an embodiment, the ECU 120 may be configured to communicate with a remote server, such as a traffic monitoring center, via the wireless communication system. In accordance to an embodiment, the ECU 124 of the target vehicle 106 may be configured similar to that of the ECU 120 of the first vehicle 104. In accordance to an embodiment, the ECU 124 of the target vehicle 106 may not be similar to the ECU 120 of the first vehicle 104.

The display device 122 may comprise suitable logic, circuitry, interfaces, and/or code that may be configured to display a plurality of image frames in a video stream under the control of the ECU 120. The display device 122 may be a liquid crystal display, an electro luminescence, a head up display or any other display device mounted on the first vehicle 104. The video stream may be captured by the image-capturing device. The display device 122 may be configured to receive an input from a user and provide an output to the user, such as the driver 114. The input may be a touch-based, voice-based, and/or gesture-based input. In accordance with an embodiment, the display device 122 may be installed in the first vehicle 104, as a part of infotainment unit or head unit of the first vehicle 104 or as an in-vehicle display. Alternatively, in accordance with an embodiment, the display device 122 may be installed in a remote traffic monitoring center (TMC). In such an instance, the display device 122 may be communicatively coupled to a network interface that may be provided in the TMC. The network interface may be communicatively coupled to the communication device 108 and/or the ECU 120, via a wireless communication system (as described in FIG. 2) of the first vehicle 104 by use of the wireless communication network 112. The video stream and other data processed by the ECU 120 may be remotely communicated via the wireless communication system of the first vehicle 104. The video stream and other processed data may then be received via the network interface of the TMC, followed by storage at a storage device, such as a data server, of the TMC for later visualization (or display). The visualization may occur in near-real time at the display device 122 that may be installed at the TMC for remote monitoring and control.

In another instance, the display device 122 may be portable display device. In such instances, the display device 122 may be communicatively coupled to the communication device 108 and/or the wireless communication system of the first vehicle 104. Examples of the display device 122 may include, but may not be limited to, an infotainment unit or head unit (HU) installed at dashboard of a car, a tablet computer, and/or other computing devices with an electronic display.

In operation, the ECU 120 may be configured to receive a plurality of image frames of a video stream from an image-capturing device. The plurality of image frames may be captured by the image-capturing device within the FOV of the image-capturing device. The ECU 120 may be configured to determine a geospatial position value and/or a direction of the FOV associated with the image-capturing device.

In accordance with an embodiment, the ECU 120 may be configured to receive one or more datasets from at least a portion of the plurality of vehicles 102. The one or more datasets may be received when the plurality of vehicles 102 pass along the road portion and are within a wireless communication range, such as the DSRC range, of the first vehicle 104 and/or the communication device 108. A dataset may include a set of vehicle parameters that may correspond to vehicle information of one or more vehicles of the plurality of vehicles 102. In accordance with an embodiment, the one or more datasets may be received when at least a portion of the plurality of vehicles 102 is within the FOV of the image-capturing device that corresponds to one or more time instants.

In accordance with an embodiment, the ECU 120 may be configured to generate a vehicle database based on the received one or more datasets. The ECU 120 may be configured to dynamically update a plurality of vehicle parameters in the vehicle database at the one or more time instants. The plurality of vehicle parameters may correspond to the received one or more datasets at different time instants.

In accordance with an embodiment, the ECU 120 may be configured to control display of the plurality of image frames in the video stream at the display device 122. The ECU 120 may be configured to receive input that corresponds to a selection of one of the plurality of image frames at a first time instant. The selected one of the plurality of image frames at the first time instant may comprise one or more vehicles.

In accordance with an embodiment, the ECU 120 may be configured to identify vehicle information associated with the one or more vehicles at the first time instant. The identification of the vehicle information may be based on extraction of relevant vehicle information associated with the one or more vehicles by use of the first time instant. The ECU 120 may be configured to filter the generated vehicle database based on the determined geospatial position value of the image-capturing device or a determined representative geospatial position of the first vehicle 104. In accordance with an embodiment, the ECU 120 may be configured to filter the generated vehicle database based on the determined direction of the FOV of the image-capturing device and/or geospatial information that corresponds to a boundary line of an area in the FOV at the first time instant. The filtering occurs to identify the vehicle information associated with the one or more vehicles at the first time instant.

In accordance with an embodiment, the ECU 120 may be configured to generate a digital model representation of the one or more vehicles. The digital model representation may be generated based on the identified vehicle information associated with the one or more vehicles. The ECU 120 may be configured to tag each of the one or more vehicles in the generated digital model representation with a unique vehicle identifier. The one or more vehicles in the generated digital model representation may be tagged to establish communication with the one or more vehicles.

In accordance with an embodiment, the ECU 120 may be configured to determine the target vehicle 106 from the one or more vehicles based on the identified vehicle information. The ECU 120 may be configured to communicate a message to the determined target vehicle 106. The communicated message may be a pull-over message, a traffic violation notice, a custom message, and/or a situational message to coordinate with the target vehicle 106 in a traffic condition.

In accordance with an embodiment, the ECU 124 of the target vehicle 106 may be configured to receive the message communicated from the ECU 120 of the first vehicle 104. The ECU 124 of the target vehicle 106 may be configured to verify authenticity of the received message. The ECU 124 of the target vehicle 106 may be configured to check whether the message is received from an authorized source, such as from the first vehicle 104 associated with the driver 114. The authenticity of received message may be verified by use of a cloud server, such as a server associated with the TMC. The received message may comprise certain metadata, such as a unique identifier of the first vehicle 104. The unique identifier may be compared with pre-stored identifiers at the cloud server. The pre-stored identifiers may correspond to authorized identifiers associated with various enforcement officers, such as the driver 114.

In instances when the message is verified to be authentic and/or received from an authorized source, the ECU 124 may be configured to control provision of the received message on a display of the target vehicle 106. For example, when the received message is a pull-over message, a visual alert, such as "PULL OVER", may be flashed on the display of the target vehicle 106. Notwithstanding, any other suitable message may be displayed without limiting the scope of the disclosure. The display may be an infotainment device, a driver information center (DIC), a heads-up display (HUD), an augmented reality (AR)-HUD, and/or other display at the target vehicle 106. In instances when the message is verified to be unauthentic or received from an unauthorized source, the received message may not be rendered, and the event may be logged for later use.

In accordance with an embodiment, the ECU 124 may be configured to communicate an acknowledgement of the message rendered at the target vehicle 106 to the first vehicle 104. The ECU 120 of the first vehicle 104 may be configured to receive the acknowledgement, via the wireless communication system of the first vehicle 104. Based on the type of message received, the ECU 124 may be configured to detect and/or continuously monitor a rate of change of speed of the target vehicle 106 subsequent to receipt of the message. In instances when the received message is a pull-over message, and the detected rate of change of speed is not below a pre-configured threshold value, an audio alert may be produced under the control of the ECU 124. The audio alert, such as an intermittent buzzer sound at an interval of a few seconds, or a continuous buzzer sound, may be an additional alert to complement the visual alert.

In accordance with an embodiment, the ECU 120 may be configured to receive a dataset from the portable device 110 associated with the pedestrian 118 at a first time instant. The ECU 120 may be communicatively coupled with the portable device 110 when the portable device 110 is within a pre-defined communication range of the ECU 120 at the road portion. The ECU 120 may be configured to identify information associated with the portable device 110. The identification of the information associated with the portable device 110 may be performed in a manner similar to that of the identification of the vehicle information, such as by use of the generated vehicle database. It may be useful in instances when the driver 114 may desire to communicate a message to a portable device, such as the portable device 110 (FIG. 1) or the display device 610 (described in FIG. 6).

Although for simplicity, FIG. 1 does not show a traffic monitoring center (TMC), one skilled in the art may appreciate that the plurality of images of the video stream of the road portion may be communicated to a remote cloud server, such as the TMC, via the wireless communication network 112. The plurality of images may then be displayed at a display device similar to the display device 122. The display device, located at the TMC, may be communicatively coupled to the ECU 120, or the communication device 108, via the wireless communication network 112. Thus, the operations performed by the ECU 120 may be produced at the display device located at the TMC. Similarly, an input received on the display device located at the TMC, may be relayed to the ECU 120 or the communication device 108.

Figure 2:
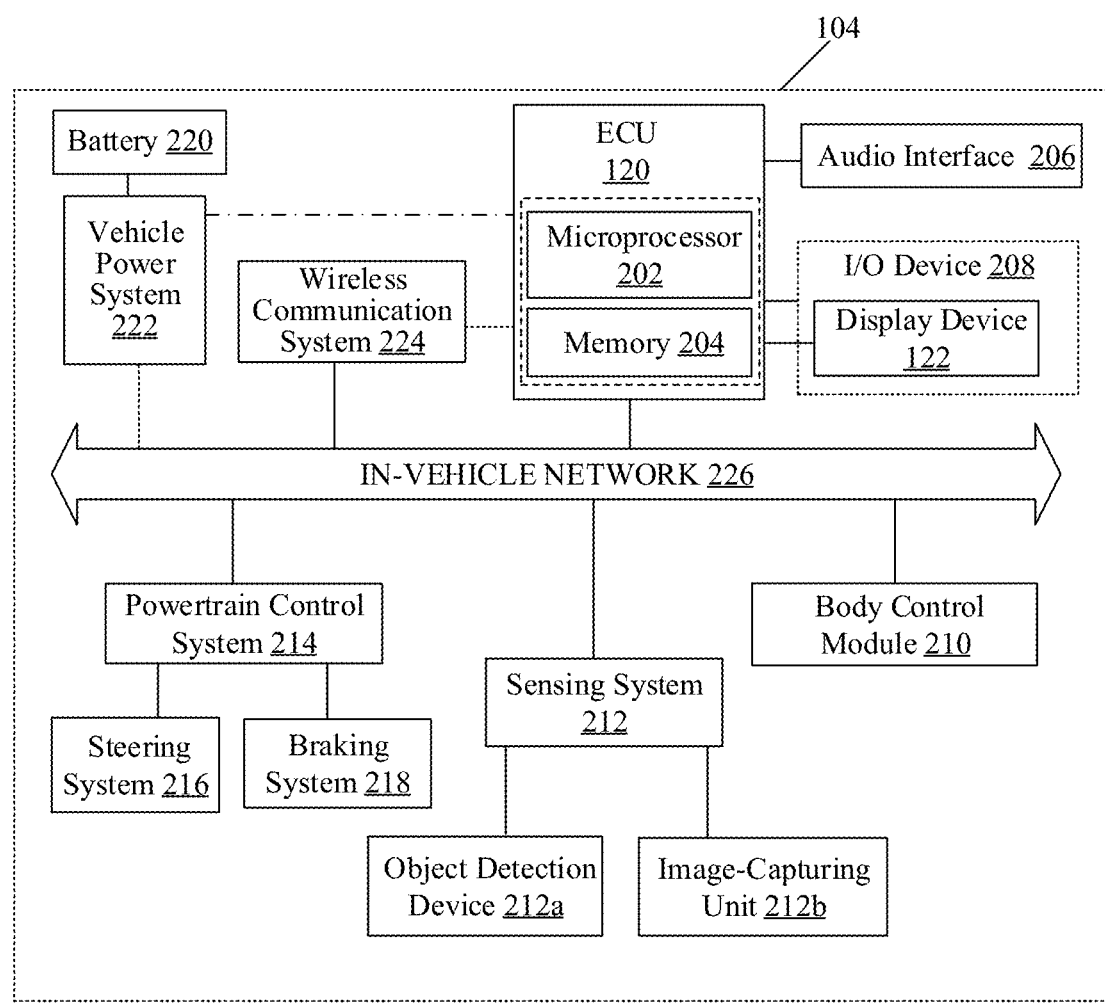
FIG. 2 is a block diagram that illustrates various exemplary components or systems of a vehicle, in accordance with an embodiment of the disclosure.

FIG. 2 is a block diagram that illustrates various exemplary components or systems of a vehicle, in accordance with an embodiment of the disclosure. FIG. 2 is explained in conjunction with elements from FIG. 1. With reference to FIG. 2, there is shown the first vehicle 104. The first vehicle 104 may comprise the ECU 120 that may include a microprocessor 202 and a memory 204. The first vehicle 104 may further comprise an audio interface 206, and/or one or more other input/output (I/O) device, such as an I/O device 208 communicatively coupled to the ECU 120. The display device 122 (FIG. 1) may be one of the I/O device 208. The first vehicle 104 may further comprise a body control module 210, a sensing system 212, and a powertrain control system 214. The sensing system 212 may include an object detection device 212a, an image-capturing unit 212b, and/or other in-vehicle sensors (not shown). The powertrain control system 214 may be associated with a steering system 216 and a braking system 218. The first vehicle 104 may further comprise a battery 220, a vehicle power system 222, a wireless communication system 224, and an in-vehicle network 226.

The various components or systems may be communicatively coupled via the in-vehicle network 226, such as a vehicle area network (VAN), and/or an in-vehicle data bus. The microprocessor 202 may be communicatively coupled to the memory 204, the audio interface 206, the display device 122, the body control module 210, the sensing system 212, the powertrain control system 214, and the wireless communication system 224. The microprocessor 202 may also be operatively connected with the steering system 216 and the braking system 218. A person ordinary skilled in the art will understand that the first vehicle 104 may also include other suitable components or systems, in addition to the components or systems which are illustrated herein to describe and explain the function and operation of the present disclosure.

The microprocessor 202 may comprise suitable logic, circuitry, interfaces, and/or code that may be configured to execute a set of instructions stored in the memory 204. The microprocessor 202 may be configured to control display of a plurality of image frames in a video stream on the display device 122. The ECU 120 may be configured to receive the one or more datasets from at least a portion of the plurality of vehicles 102, via the wireless communication system 224. Examples of the microprocessor 202 may be an X86-based processor, a Reduced Instruction Set Computing (RISC) processor, an Application-Specific Integrated Circuit (ASIC) processor, a Complex Instruction Set Computing (CISC) processor, a microcontroller, a central processing unit (CPU), a graphics processing unit (GPU), a state machine, and/or other processors or circuits. The memory 204 may be further configured to store one or more text-to-speech conversion algorithms, one or more speech-generation algorithms, audio data that corresponds to various buzzer sounds, and/or other data. The memory 204 may comprise suitable logic, circuitry, and/or interfaces that may be configured to store a machine code and/or a set of instructions with at least one code section executable by the microprocessor 202. Examples of implementation of the memory 204 may include, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), and/or CPU cache memory.

The audio interface 206 may be connected to a speaker, a chime, a buzzer, or other device that may be operable to generate a sound. The audio interface 206 may also be connected to a microphone or other device to receive a voice input from an occupant, such as the driver 114, of the first vehicle 104. The audio interface 206 may also be communicatively coupled to the microprocessor 202. The audio interface 206 may be a part of an in-vehicle infotainment (IVI) system or head unit of the first vehicle 104.

The I/O device 208 may refer to input and output devices that may receive and provide output to an occupant of the first vehicle 104, such as the driver 114. The I/O device 208 may be communicatively coupled to the microprocessor 202. Examples of the input devices may include, but are not limited to, a touch screen, such as a touch screen of the display device 122, a microphone, a motion sensor, a light sensor, and/or a docking station. Examples of the output devices may include, but are not limited to, the display device 122 and other vehicle display, such as a HUD, an AR-HUD, a DIC, a see-through display, a projection-based display, a DIC, an infotainment unit's display, a smart-glass display, an electro-chromic display, and/or the speaker.

The display device 122 may be one of the I/O device 208. In accordance with an embodiment, the display device 122 may be a touch screen display that may receive an input from the driver 114. The display device 122 may also be configured to provide output to the driver 114. Examples of the display device 122 may include, but are not limited to, a heads-up display (HUD) or a head-up display with an augmented reality system (AR-HUD), a driver information console (DIC), a display screen of an infotainment unit or a head unit (HU), a see-through display, a projection-based display, a smart-glass display, and/or an electro-chromic display. The display device 122 may be a transparent or a semi-transparent display screen. The display device 122 may generate a two-dimensional (2D) or a three-dimensional (3D) graphical view of the generated digital model representation. The graphical views may be generated under the control of the microprocessor 202.

The body control module 210 may refer to another electronic control unit that comprises suitable logic, circuitry, interfaces, and/or code that may be configured to control various electronic components or systems of the first vehicle 104. The body control module 210 may be configured to receive a command from the microprocessor 202. The body control module 210 may relay the command to other suitable vehicle systems or components for access control of the first vehicle 104.

The sensing system 212 may comprise the object detection device 212a, the image-capturing unit 212b, and/or one or more other vehicle sensors provided in the first vehicle 104. The sensing system 212 may be operatively connected to the microprocessor 202 to provide input signals to the microprocessor 202. The object detection device 212a may be a radio detection and ranging (RADAR) device or a laser-based object detection sensor, such as a light detection and ranging (LIDAR) device.

The image-capturing unit 212b may be configured to capture video of the road portion. The video stream may include a plurality of image frames within the FOV of the image-capturing unit 212b. The image-capturing unit 212b may be configured to record time of capture of each frame of the plurality of image frames in the video stream. The image-capturing unit 212b may be installed in front of the first vehicle 104. Examples of the image-capturing unit 212b may include, but are not limited to, an image sensor, a wide-angle camera, a closed-circuit television (CCTV) camera, a camcorder, an in-built camera of a smart-glass, and/or other vehicle camera. The image-capturing device 112b may include one of variety of sensors, such as optical cameras, ultrasound sensors, RADAR, LIDAR, infrared cameras, and/or infrared RADAR.

The one or more other vehicle sensors of the sensing system 212 may be used to sense or detect a direction of travel, geospatial position, steering angle, yaw rate, speed, and/or rate of change of speed of the first vehicle 104. The first sensor data may be sensed or detected by use of one or more vehicle sensors of the sensing system 212, such as a yaw rate sensor, a vehicle speed sensor, odometric sensors, a steering angle sensor, a vehicle travel direction detection sensor, a magnetometer, and a global positioning system (GPS). Other examples of the one or more other vehicle sensors may include, but are not limited to, a yaw rate sensor, a vehicle speed sensor, a speedometer, a global positioning system (GPS), a steering angle detection sensor, a vehicle travel direction detection sensor, a magnetometer, a touch sensor, and/or an infrared sensor.

The powertrain control system 214 may refer to an onboard computer of the first vehicle 104 that controls operations of an engine and a transmission system (when provided) of the first vehicle 104. The powertrain control system 214 may control ignition, fuel injection, emission systems, and/or operations of a transmission system (when provided) and the braking system 218.

The steering system 216 may be configured to receive one or more commands from the microprocessor 202. In accordance with an embodiment, the steering system 216 may automatically control the steering of the first vehicle 104. Examples of the steering system 216 may include, but are not limited to, a power assisted steering system, a vacuum/hydraulic based steering system, an electro-hydraulic power assisted system (EHPAS), and/or a "steer-by-wire" system, known in the art.

The braking system 218 may be used to stop or slow down the first vehicle 104 by application of frictional forces. The braking system 218 may be configured to receive a command from the powertrain control system 214 under the control of the microprocessor 202 when the first vehicle 104 is in an autonomous mode or a semi-autonomous mode. In accordance with an embodiment, the braking system 218 may be configured to receive a command from the body control module 210 and/or the microprocessor 202 when the microprocessor 202 preemptively detects a steep curvature, an obstacle, or other road hazards. The braking system 218 may be associated with a brake pedal and/or a gas pedal.

The battery 220 may be source of electric power for one or more electric circuits or loads (not shown). For example, the loads may include, but are not limited to various lights, such as headlights and interior cabin lights, electrically powered adjustable components, such as vehicle seats, mirrors, windows or the like, and/or other in-vehicle infotainment system, such as radio, speakers, electronic navigation system, electrically controlled, powered and/or assisted steering, such as the steering system 216. The battery 220 may be a rechargeable battery. The battery 220 may be a source of electrical power to the ECU 120 (shown by dashed lines), the sensing system 212, and/or one or hardware units, such as the display device 122, of the in-vehicle infotainment system. The battery 220 may be a source of electrical power to start an engine of the first vehicle 104 by selectively providing electric power to an ignition system (not shown) of the first vehicle 104.

The vehicle power system 222 may regulate the charging and the power output of the battery to various electric circuits and the loads of the first vehicle 104, as described above. When the first vehicle 104 is a hybrid vehicle or an autonomous vehicle, the vehicle power system 222 may provide the required voltage for all of the components and enable the first vehicle 104 to utilize the battery 220 power for a sufficient amount of time. In accordance with an embodiment, the vehicle power system 222 may correspond to power electronics, and may include a microcontroller that may be communicatively coupled (shown by dotted lines) to the in-vehicle network 226. In such an embodiment, the microcontroller may receive command from the powertrain control system 214 under the control of the microprocessor 202.

The wireless communication system 224 may comprise suitable logic, circuitry, interfaces, and/or code that may be configured to communicate with one or more external devices, such as the communication device 108, and one or more cloud servers, and/or one or more vehicles, such as the target vehicle 106. Such communication with the one or more external devices may occur by use of the wireless communication network 112. The wireless communication system 224 may include, but is not limited to, an antenna, a telematics unit, a radio frequency (RF) transceiver, one or more amplifiers, one or more oscillators, a digital signal processor, a coder-decoder (CODEC) chipset, and/or a subscriber identity module (SIM) card. The wireless communication system 224 may wirelessly communicate by use of the wireless communication network 112 (as described in FIG. 1).

The in-vehicle network 226 may include a medium through which the various control units, components, and/or systems of the first vehicle 104, such as the ECU 120, body control module 210, the sensing system 212, the powertrain control system 214, the wireless communication system 224, the audio interface 206, and the display device 122, may communicate with each other. In accordance with an embodiment, in-vehicle communication of audio/video data for multimedia components may occur by use of Media Oriented Systems Transport (MOST) multimedia network protocol of the in-vehicle network 226. The MOST-based network may be a separate network from the controller area network (CAN). The MOST-based network may use a plastic optical fiber (POF). In accordance with an embodiment, the MOST-based network, the CAN, and other in-vehicle networks may co-exist in a vehicle, such as the first vehicle 104. The in-vehicle network 226 may facilitate access control and/or communication between the microprocessor 202 (and the ECU 120) and other ECUs, such as a telematics control unit (TCU) of the first vehicle 104. Various devices or components in the first vehicle 104 may be configured to connect to the in-vehicle network 226, in accordance with various wired and wireless communication protocols. Examples of the wired and wireless communication protocols for the in-vehicle network 226 may include, but are not limited to, a vehicle area network (VAN), a CAN bus, Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit ($I^2C$), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

In operation, the microprocessor 202 may be configured to receive a plurality of image frames of a video stream of a road portion, via the in-vehicle network 226. The video stream may be a live stream of the traffic in the road portion. The microprocessor 202 may be configured to receive time of capture of each frame of the plurality of image frames in the video stream from the image-capturing unit 212b. The received video stream may be stored at the memory 204, which associates the time of capture information with each image frame during time of day.

In accordance with an embodiment, the microprocessor 202 may be configured to receive sensor data from the sensing system 212. The microprocessor 202 may be configured to determine a geospatial position value of the image-capturing unit 212b. The microprocessor 202 may be configured to determine a direction of the FOV associated with the image-capturing unit 212b that captures the video stream.

In accordance with an embodiment, the microprocessor 202 may be configured to receive one or more datasets from at least a portion of the plurality of vehicles 102, via the wireless communication system 224. The one or more datasets may be received when the plurality of vehicles 102 pass along the road portion and are within a wireless communication range, such as the DSRC range, of the first vehicle 104, and/or the communication device 108. A dataset includes a set of vehicle parameters that may correspond to vehicle information of a vehicle of the plurality of vehicles 102. In accordance with an embodiment, the one or more datasets may be received when at least a portion of the plurality of vehicles 102 are within the FOV of the image-capturing unit 212b that corresponds to one or more time instants. For example, a certain number of datasets, such as 10 datasets, that correspond to equal number of vehicles, such as 10 vehicles, may be received at a first time instant. At a second time instant, another set of vehicles, such as 6 vehicles, may pass through the road portion and establish communication channels within the wireless range of the wireless communication system 224. Accordingly, 6 datasets for the 6 vehicles may be received at the second time instant.

In accordance with an embodiment, the microprocessor 202 may be configured to generate a vehicle database based on the received one or more datasets. The microprocessor 202 may be configured to dynamically update a plurality of vehicle parameters in the vehicle database at the one or more time instants. The plurality of vehicle parameters may correspond to the received one or more datasets at different time instants. A data structure of the vehicle database is described in detail in FIG. 3.

In accordance with an embodiment, the microprocessor 202 may be configured to receive an authorization request from a user, such as the driver 114, to display the captured video stream to monitor the traffic of the road portion. The microprocessor 202 may be configured to determine authorization based on validation of user information, such as biometric data, user credentials, and/or an identification code received from the driver 114.

In accordance with an embodiment, the microprocessor 202 may be configured to control display of the plurality of image frames in the video stream on the display device 122. In accordance with an embodiment, the display of the plurality of image frames may occur subsequent to the authorization. In accordance with an embodiment, the display of the plurality of image frames may be controlled based on pre-set user preferences, such as preferences set by the driver 114. The microprocessor 202 may be configured to receive input that corresponds to selection of one of the plurality of image frames at a first time instant. The selected plurality of image frames at the first time instant may comprise one or more vehicles. When a suspect vehicle from among the one or more vehicles is noticed in the image frame, the driver 114 may select the image frame from the plurality of image frames. The suspect vehicle may be the target vehicle 106, to which a message is to be communicated.

In accordance with an embodiment, the microprocessor 202 may be configured to identify vehicle information associated with the one or more vehicles in the selected image frame. The identification of the vehicle information may be based on extraction of vehicle information associated with the one or more vehicles detected during first time instant. The first time instant may correspond to the time of capture of the image frame. In other words, the first time instant corresponds to a time point when at least a portion of the plurality of vehicles 102 were communicatively coupled to the ECU 120 of the first vehicle 104. The identified vehicle information associated with the one or more vehicles may correspond to a unique vehicle identifier, a vehicle position, a vehicle size, a direction of travel, and/or a vehicle speed value. The identified vehicle information associated with the one or more vehicles may further correspond to a steering angle, a vehicle positional accuracy data, a brake system status, a status of a vehicle stability system, yaw rate, a rate of change of speed, lane information, and/or other vehicle parameters.

In accordance with an embodiment, the microprocessor 202 may be configured to identify vehicle information based on filtering the generated vehicle database at the first time instant. The microprocessor 202 may be configured to filter the generated vehicle database based on the determined geospatial position value of the image-capturing unit 212b. The microprocessor 202 may be configured to convert the vehicle position, such as latitude and longitude coordinates, of the one or more vehicles to determined geospatial position value, such as geospatial coordinates, of the image-capturing unit 212b. The vehicle position may correspond to one of the vehicle parameters associated with the one or more vehicles of the identified vehicle information. The converted vehicle position may be utilized for generation of a digital model representation of the one or more vehicles in the selected image frame of the plurality of image frames. In accordance with an embodiment, the microprocessor 202 may be configured to filter the generated vehicle database based on the determined direction of the FOV of the image-capturing unit 212b and/or geospatial information that corresponds to a boundary line of an area in the FOV at the first time instant.

In accordance with an embodiment, the microprocessor 202 may be configured to generate the digital model representation of the one or more vehicles in the selected image frame. The generated digital model representation may indicate the FOV of the image-capturing unit 212b at the first time instant. The digital model representation may be generated based on the identified vehicle information associated with the one or more vehicles at the first time instant. In accordance with an embodiment, the microprocessor 202 may be configured to dynamically generate a digital model representation of one or more of the captured plurality of image frames based on the generated vehicle database.

In accordance with an embodiment, the microprocessor 202 may be configured to tag each of the one or more vehicles in the generated digital model representation with a unique vehicle identifier. The one or more vehicles in the generated digital model representation may be tagged to establish communication with the one or more vehicles.

In accordance with an embodiment, the microprocessor 202 may be configured to control display of the generated digital model representation on the display device 122. The generated digital model representation comprises a top view of the one or more vehicles in the FOV of the image-capturing unit 212b, at the first time instant. The top view may indicate an arrangement of the one or more vehicles in the generated digital model representation, based on the identified vehicle information. The arrangement may correspond to vehicle position, vehicle order in one or more lanes, and/or vehicle direction of travel at the first time instant for the one or more vehicles.

The microprocessor 202 may further arrange and/or order the one or more vehicles in the generated digital model representation. The one or more vehicles in the generated top view may be linked to the unique identifiers of the one or more vehicles. Such linkage may be useful to establish communication with the one or more vehicles. In accordance with an embodiment, the microprocessor 202 may be configured to utilize vehicle speed values, from the identified vehicle information associated with the one or more vehicles, to determine a lane width. The determined lane width may be used to determine vehicle order in the one or more lanes in generated digital model representation. Similarly, the generated digital model representation may display a certain area in the FOV of the image-capturing unit 212b, at the first time instant. The area to be displayed in the generated digital model representation may be determined or mapped based on the vehicle speed values associated with the one or more vehicles. The mapped area may be larger when the average speed of the one or more vehicles is higher than a pre-determined threshold.

There may be instances when the object detection device 212a, such as a RADAR device of the sensing system 212 is used, in addition to the image-capturing unit 212b. In such a case, the microprocessor 202 may be configured to convert the objects, such as one or more vehicles, detected in the video stream, to one or more interactive objects within the video stream. Hence, a separate digital model representation may not be generated in such a case. The interactive objects may correspond to selectable regions in the video stream that may be activated based on an input provided by the user, such as the driver 114 associated with the first vehicle 104. The input may be provided to select one of the interactive objects. The selected interactive object may correspond to a specific vehicle, such as the target vehicle 106, from the one or more vehicles.

In accordance with an embodiment, the microprocessor 202 may be configured to determine the target vehicle 106, from the one or more vehicles based on the identified vehicle information. The target vehicle 106 may be determined based on filtered information from the identified vehicle information. The identified vehicle information may be filtered based on the determined geospatial position value of the image-capturing device, the determined direction of the field-of-view of the image-capturing device, geospatial information that corresponds to a boundary line of an area in the FOV at the first time instant, and/or one or more thresholds values. In accordance with an embodiment, the microprocessor 202 may be configured to determine the target vehicle 106 from the one or more vehicles, based on a user input to select the target vehicle 106 from the displayed digital model representation.

In accordance with an embodiment, the microprocessor 202 may be configured to communicate a message to the determined target vehicle 106. The communicated message may be a pull-over message, a traffic violation notice, a custom message, and/or a situational message. The message may be used to coordinate with the target vehicle 106 in a traffic condition. The message may be communicated to the target vehicle 106, via the wireless communication network 112, such as the DSRC channel or the LTE protocol (in a vehicle-to-vehicle (V2V) communication). In accordance with an embodiment, the message may be communicated to the target vehicle 106, via the communication device 108, such as a road-side communication unit (an infrastructure to vehicle (I2V) communication), and/or a cloud server of the TMC (a cloud to vehicle communication). In accordance with an embodiment, the microprocessor 202 may be configured to receive an acknowledgement for the communicated message from the ECU 124 of the target vehicle 106.

FIG. 3 illustrates a data structure of a vehicle database for implementation of the disclosed system and method for communication of a message to a vehicle, in accordance with an embodiment of the disclosure. FIG. 3 is explained in conjunction with elements from FIG. 1 and FIG. 2. With reference to FIG. 3, there are shown relational tables 300 and 320. The table 300 depicts data structure related to different datasets at different time instants. The table 320 depicts data structure related to vehicle information in each dataset.

In the table 300, the column 302 may store data for a time instant in a date and time format (such as day-month-year-hour-minutes-seconds-milliseconds) such that each time instant value is unique. The columns 304, 306, 308 and 310 may store dataset identifier values that may reference the column 322 (datasets) in the table 320. Thus, a relational data structure between tables 300 and 320 may be defined. In an example, in the row that corresponds to the time instant "T1", there are shown three dataset identifier values, "D1", "D2", and "D3", assigned to three different datasets received from three vehicles that are communicatively coupled with the first vehicle 104 at the time instant "T1". Similarly, after a few milliseconds or seconds, such as at the time instant "T2", there are shown three dataset identifier values, "D4", "D5", and "D3". The dataset identifier values "D4" and "D5" may be assigned to two different datasets received from other two vehicles that are communicatively coupled with the first vehicle 104 at the next time instant "T2". At the time instant "T2", the vehicles that may not be communicatively coupled (for example, not in the DSRC range of the wireless communication system 224 of the first vehicle 104) and which corresponds to the dataset identifier values "D1" and "D2", may be removed. At the time instant "T2", the vehicle(s) that may still be communicatively coupled (for example, within the DSRC range of the wireless communication system 224 of the first vehicle 104) and which corresponds to the dataset identifier value "D3", may not be removed from the row that corresponds to the time instant "T2", as shown in FIG. 3.

In the table 320, the columns 324 to 346 may store values for different vehicle parameters for each dataset of the column 322 (as shown). Examples of the vehicle parameters include, but are not be limited to, a unique vehicle identifier, such as DSRCmsgID 324, a latitude 326, a longitude 328, an elevation 330, direction of travel, such as a heading 332, a vehicle positional accuracy 334, a vehicle speed value 336, a steering angle 338, a brake system status 340, a rate of change of speed 342, a vehicle stability system status 344, and/or other vehicle parameters 346. Thus, a dataset comprises values for different vehicle parameters that correspond to vehicle information of a vehicle from which the dataset is received at a certain time instant.

Figure 4A:
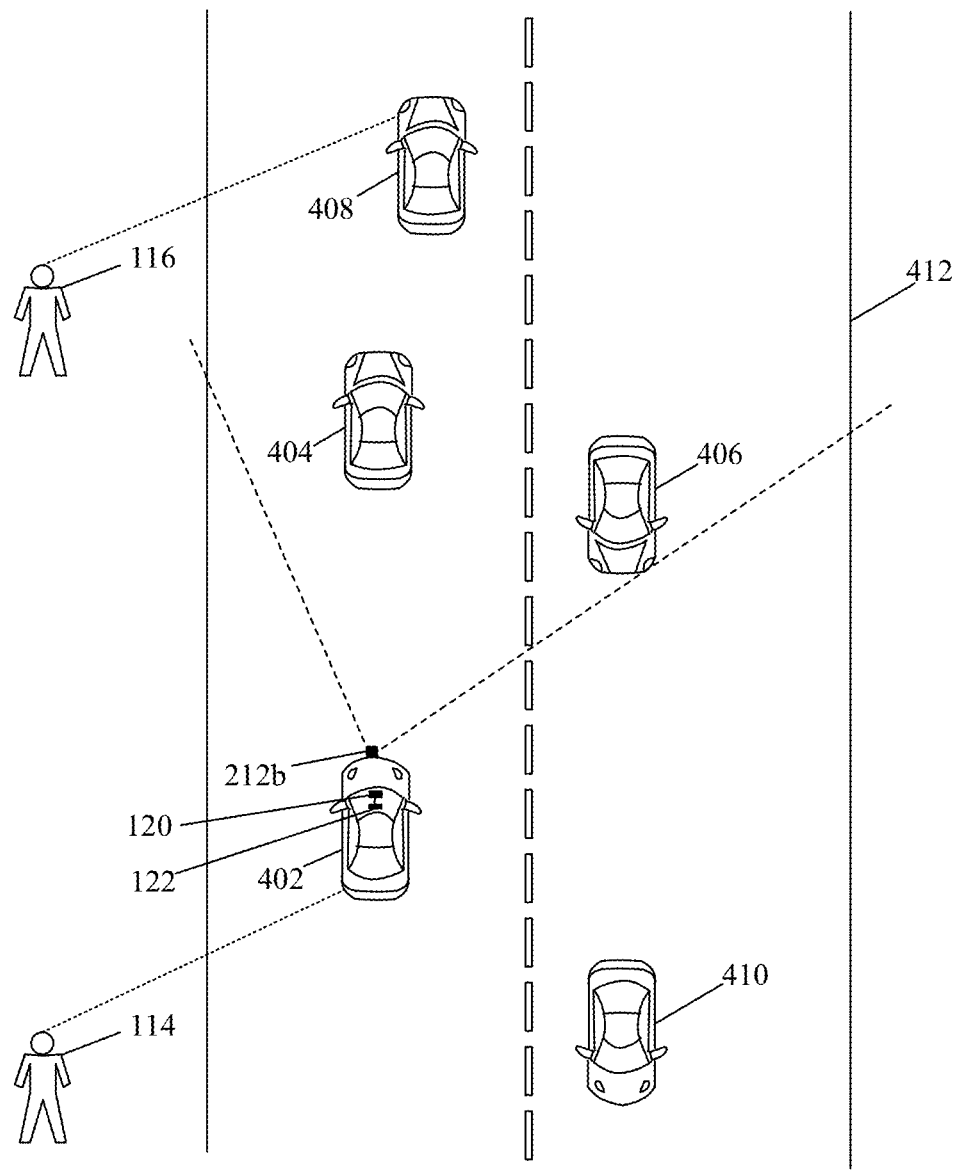
FIGS. 4A to 4G illustrate a first exemplary scenario for implementation of the disclosed system and method for communication of a message to a vehicle, in accordance with an embodiment of the disclosure.

FIGS. 4A to 4G illustrate a first exemplary scenario for implementation of the disclosed system and method for communication of a message to a vehicle, in accordance with an embodiment of the disclosure. FIGS. 4A to 4G are explained in conjunction with elements from FIGS. 1, 2, and 3. With reference to FIG. 4A, there is shown a plurality of vehicles, such as a first car 402, a second car 404, a third car 406, a fourth car 408, and a fifth car 410, that may traverse along a road portion 412 at a first time instant. For the sake of brevity, the ECU 120, the display device 122, the image-capturing device 112b (FIG. 2) of the first vehicle 104, are shown installed in the first car 402, hereinafter.

In accordance with the first exemplary scenario, the first car 402 may correspond to the first vehicle 104. The first car 402 may be associated with the driver 114. One or more vehicles, such as the second car 404, the third car 406, and the fourth car 408, may be within the FOV of the image-capturing unit 212b of the first vehicle 104. In accordance with an embodiment, the ECU 120 may be configured to receive datasets from the second car 404, the fourth car 408, and the fifth car 410. The datasets may be received when the cars pass along the road portion 412, and are within a wireless communication range, such as the DSRC range, of the first car 402.

Figure 4B:
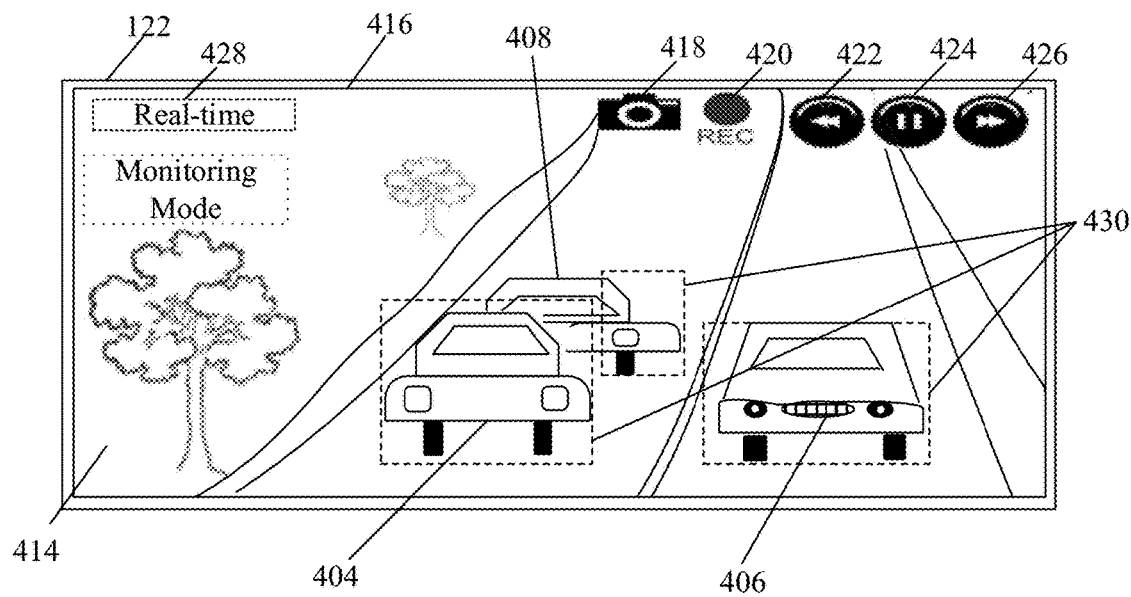

With reference to FIG. 4B, there is shown one or more vehicles, such as the second car 404, the third car 406, and the fourth car 408, captured by the image-capturing device 112b, and displayed in a video stream 414 rendered at a user interface (UI) 416. The UI 416 may be rendered in a monitoring mode on the display device 122 of the first car 402, as shown. The UI 416 may comprise various icons 418 to 426, as shown. The icon 418 may be selected by a user, such as the driver 114 of the first car 402, to store a still image associated with displayed image in the video stream 414. The icon 420 may be used by the driver 114 to start or stop recording of the video stream 414 captured by the image-capturing unit 212b. The icon 422 may be a reverse icon used to playback the video stream 414 from a previous predetermined time period (for example, 5 seconds before) or user-desired time period, which is selected by the user. The icon 424 may be used to perform a pause action on the video stream 414 to the displayed image. The icon 426 may be a forward icon used to forward the image frame 414a displayed in the video stream 414. An indication 428, such as a text "Real-time", depicts that the video stream 414 is processed in a real-time or near real-time. The dotted squares 430 indicates moving objects detected by processing of a plurality of image frames of the video stream 414 captured by the image-capturing unit 212b.

In accordance with an embodiment, the ECU 120 may be configured to control display of the plurality of image frames in the video stream 414 on the display device 122 of first car 402. An example of the displayed image frame in the video stream 414 is shown in the FIG. 4B. In this case, real-time processed image frames of the video stream 414 are displayed on the display device 122. The driver 114 may identify a specific vehicle in the monitoring mode to which the driver 114 may desire to communicate. The driver 114 may provide an input to change the monitoring mode to a communication mode. In this case, the driver 114 may select the icon 424 to pause the video stream 414 when the driver 114 identifies the specific vehicle in the monitoring mode (FIG. 4B). In response to the input, the display mode of the UI 416 may be changed to a communication mode, as illustrated in FIG. 4C.

Figure 4C:
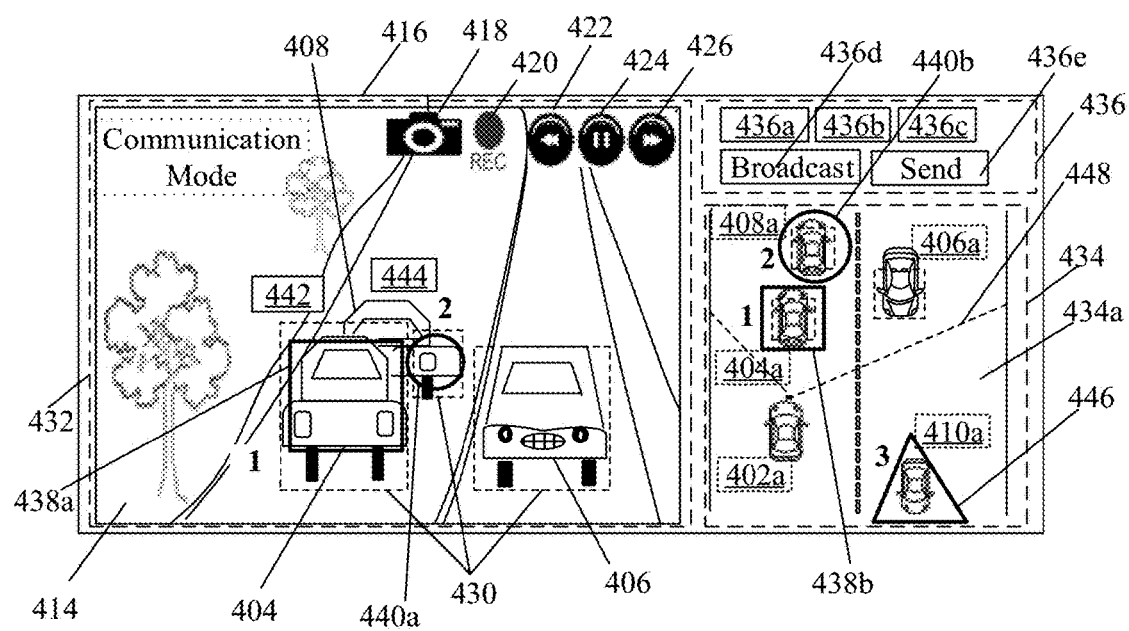

With reference to FIG. 4C, there is shown the UI 416 in the communication mode. In the communication mode, the UI 416 includes three display areas, such as a video stream area 432 where the video stream 414 captured by the image-capturing unit 212b is displayed, a digital model representation area 434, and an information items selection area 436. In this case, among the one or more vehicles, the first car 402 receives the datasets from the second car 404 and the fourth car 408, as described previously in FIG. 4A. The third car 406 may not have a communication device to communicate with the first car 402.

Based on the datasets received from the one or more vehicles, highlighted marks 438a and 440a, and serial numbers, such as "1" and "2", are located on each vehicle whose datasets are received and which may be included in the displayed image frame 414a. The highlighted marks 438a and 440a may be displayed in different shapes and/or colors in the video stream area 432 along-with the serial numbers to distinguish each vehicle on the displayed image frame 414a. In this example, the highlighted mark 438a is a square and the highlighted mark 440a is a circle. The serial numbers may correspond to a unique number that may be assigned to each vehicle and displayed together with the highlighted marks. In this case, number "1" is assigned to second car 404 and number "2" is assigned to the fourth car 408. Based on the received datasets, some parameters of the vehicle information may be displayed near the corresponding vehicle. In this example, speed of each vehicle extracted from corresponding datasets may be displayed via UI elements 442 and 444. The UI element 442 may display one or more vehicle parameters, such as "current speed 50 km per Hour" of the second car 404. The UI element 442 may also display information, such as "With ADAS", which indicates that the second car 404 has a surrounding monitoring system, such as advanced driver assistance systems (ADAS), to detect moving objects in the surrounding. The UI element 444 may display one or more vehicle parameters, such as "Speed: 90 km per Hour", of the fourth car 408. The UI element 444 may also display information, such as "NO ADAS", which indicates that the fourth car 408 does not have a surrounding monitoring system to detect moving objects in the surrounding. Based on the display of the highlighted marks 438a and 440a or one or more vehicle parameters in the video stream area 432, occupants (such as the driver 114 or passengers) of the first car 402 can easily understand that the second car 404 and the fourth car 408, have the ability to communicate with the first car 402.

In the digital model representation area 434 of the UI 416, a digital model representation 434a may be rendered. The icons 404a, 406a, and 408a may be representations of the one or more vehicles, such as the second car 404, the third car 406, and the fourth car 408, included in the displayed image frame 414a. The icon 402a represents the first car 402 that captured the video stream 414 by use of the image-capturing device 112b, and may be present in the vicinity of the second car 404, the third car 406, and the fourth car 408. The icon 410a represents the fifth car 410 in the vicinity of the first car 402 in the road portion 412 at the time of capture of the displayed image frame 414a. The icons 404a, 408a, and 410a may be indications of the one or more vehicles whose datasets are received at the first car 402. Such one or more vehicles may be determined based on images captured by the image-capturing device 112b.

The digital model representation 434a may be displayed from a top view. The top view may indicate an arrangement of the one or more vehicles in the rendered digital model representation 434a. The arrangement of the one or more vehicles in the rendered digital model representation 434a may correspond to vehicle position, vehicle ordering in one or more lanes of the road portion 412, vehicle size, vehicle type, and/or vehicle direction of travel. The arrangement of the one or more vehicles in the rendered digital model representation 434a may also provide an easy understanding of a real-world traffic scenario associated with the one or more vehicles along a road portion (such as the road portion 412 in this case) at a certain time instance, such as a time instance when the one or more vehicles were captured by the image-capturing unit 212b that corresponds to the displayed image frame 414a. For example, to establish a correspondence between the displayed image frame 414a in the video stream area 432 and the rendered digital model representation 434a, and to indicate receipt of vehicle data, such as the datasets, at the first car 402 from certain vehicles of the one or more vehicles, highlighted marks 438b and 438b and the unique numbers, such as the numbers "1" and "2" may be located near the icon 404a of the second car 404 and the icon 408a of the fourth car 408. The highlighted marks 438b and 438b and the unique numbers in the digital model representation area 434 may be similar to the highlighted marks 438a and 438a and unique numbers, such as the numbers "1" and "2", indicated on the video stream area 432 for easy recognition of the one or more vehicles included in the displayed image frame 414a from which the datasets are received. Further, other surrounding vehicles, such as the fifth car 410, in the vicinity of the first car 402 from which a dataset is also received may also be indicated by a highlighted mark 446, and/or a unique number "3". Also, a field-of-view (FOV) 448 of the image-capturing device 112b and the dotted squares 430 are displayed around each of the icons 404a, 406a, and 408a of the vehicles, such as the second car 404, the third car 406, and the fourth car 408. The dotted squares 430 may be displayed for the vehicles which may be within the FOV 448 of the image-capturing device 112b, and determined as moving objects along the road portion 412. Thus, by use of the digital model representation area 434, the driver 114 of the first car 402 may understand which of the surrounding vehicles can communicate with the first car 402 (an ego-vehicle), and which vehicles may be visible in a forward sight (of the driver 114) as per direction of travel of the first car 402.

In the information items selection area 436, a plurality of pre-determined information items, such as a first information item 436a, a second information item 436b, and a third information item 436c, may be selectable and displayed to broadcast (by use of a UI element 436d) or send (by use of a UI element 436e) the selected information item to one or more surrounding vehicles. For example, the first information item 436a may be a "Sensed information", such as information of moving objects near the first car 402 as detected by the image-capturing unit 212b and/or other sensors or devices of the sensing system 212. The first information item 436a may be information related to road-hazards or objects that may potentially cause an accident. For instance, a pedestrian detected on a sidewalk, or a pothole on the road portion 412 may be a road-hazard. The second information item 436b may be a message, such as "Make way for me" to inform one or more identified vehicles to slow down or stop. The third information item 436c may be message, such as "Speed up by a speed limit", to inform an identified vehicle to speed up. The plurality of pre-determined information items may be specific messages that can be communicated to a specific vehicle of the one or more vehicles or broadcasted to surrounding vehicles with communication devices. For instance, a UI element 436d, such as a "Broadcast" button, may be used to broadcast a selected information item to surrounding vehicles with communication devices. A UI element 436e, such as a "Send" button, may be used to send the selected information item to one or more vehicles identified by the user (such as the driver 114) of the first car 402, as shown.

Figure 4D:
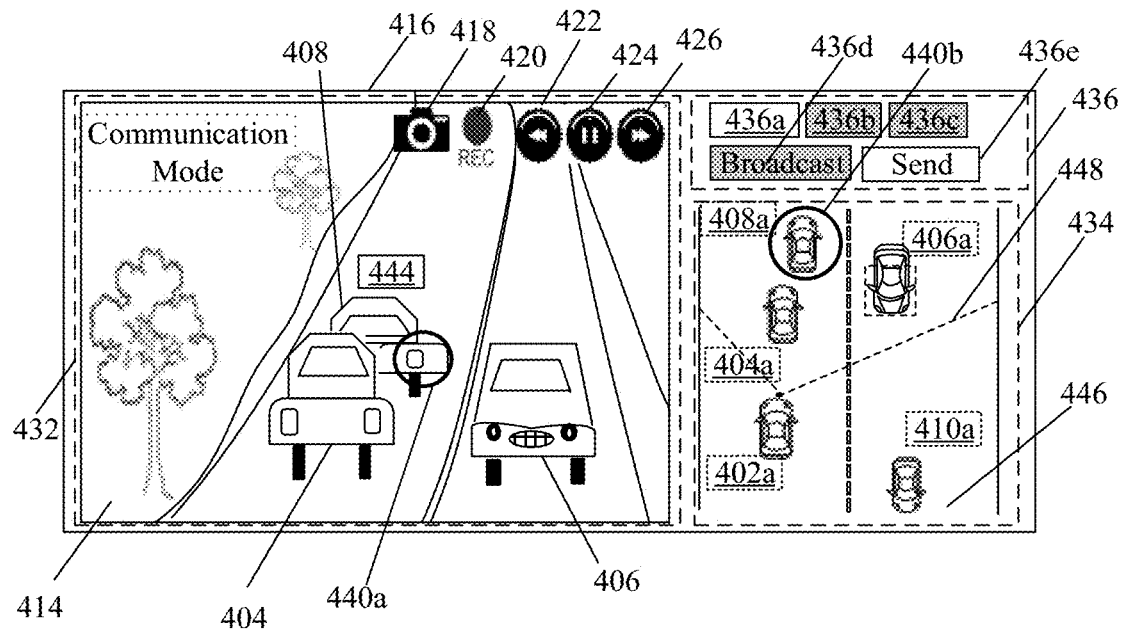

With reference to FIG. 4D, there is shown the UI 416 in the communication mode to further describe various operations performed by use of the UI 416 when the communication mode is set. In accordance with an embodiment, the ECU 120 may be configured to receive input corresponding to selection of one or more vehicles in either the video stream area 432 or the digital model representation area 434 to send selected information from the information items selection area 436. In this case, the fourth car 408 may be selected by use of the icon 408a. In accordance with an embodiment, the ECU 120 may be configured to highlight the selected vehicle(s) (the vehicle identified by the user of the first car 402) in both of the video stream area 432 and the digital model representation area 434. In this case, the fourth car 408 may be highlighted as indicated by the highlighted mark 440a (a highlighted indicia) in the video stream area 432 and the highlighted mark 440b in the digital model representation area 434. In this case, the dotted squares 430, the UI elements 442 and 444, the highlight marks 438a and 438b, and the highlighted mark 446 (as shown in FIG. 4C), associated with the vehicles that may not be selected, may be masked or removed from the UI 416.

In accordance with an embodiment, the ECU 120 may be configured to activate or deactivate the pre-determined information items based on characteristics of the selected vehicle. Such activation or deactivation may occur simultaneous to the highlight and/or mask operation, as described above. In other words, one or more information items which can be sent to the selected vehicle, such as the fourth car 408 in this case, may be determined and activated, and other information items which cannot be sent to the selected vehicle may be deactivated, based on characteristics of the selected vehicle, such as the fourth car 408. For instance, in this case, the current speed of the fourth car 408 extracted from received vehicle data (such as received datasets) of the fourth car 408 may be "90 km/h" (as illustrated by the UI element 444 in FIG. 4B). The current speed of the fourth car 408 may be over the speed limit (such as "60 km/h") of the road portion 412. In such an instance, the ECU 120 may determine that the third information item 436c, such as "Speed up by a speed limit", may not be relevant to be sent to the fourth car 408. Subsequently, the ECU 120 may be configured to deactivate the third information item 436c. The deactivation may occur by graying-out (as shown) of UI elements that corresponds to the third information item 436c to indicate a deactivated or disabled state. Similarly, as the speed of "90 km/h" of the fourth car 408 is high enough, the second information item 436b, such as "Make way for me" may also be deactivated. Further, as a single vehicle is selected in this case, the UI element 436d that corresponds to the broadcast feature may also be deactivated. As the fourth car 408 does not have a system to detect the surrounding moving objects, the first information item 436a, such as "Sensed information", may be activated. As a result, a display of the communication mode is updated via the UI 416, as illustrated in FIG. 4D.

In accordance with an embodiment, the ECU 120 may be configured to select one of the pre-determined information items that may be selected and/or activated. In this case, the first information item 436a may be selected by the user of the first car 402, via the UI 416 rendered on a display device, such as the display device 122, provided in the first car 402. In accordance with an embodiment, the ECU 120 may be configured to highlight the selected information item, such as the first information item 436a. The user, such as the driver 114, of the first car 402 may select the UI element 436e to send the selected information item, such as the first information item 436a, to the selected vehicle(s), such as the fourth car 408 in this case. For example, a driving direction, speed, and geographical position of a potential road hazard (such as a motorcycle that may hidden from the sight of the other driver 116 of the fourth car 408 and may be moving at a high speed), as detected by the image-capturing unit 212b or the object detection device 212a of the first car 402, may be communicated to the fourth car 408.

Figure 4E:
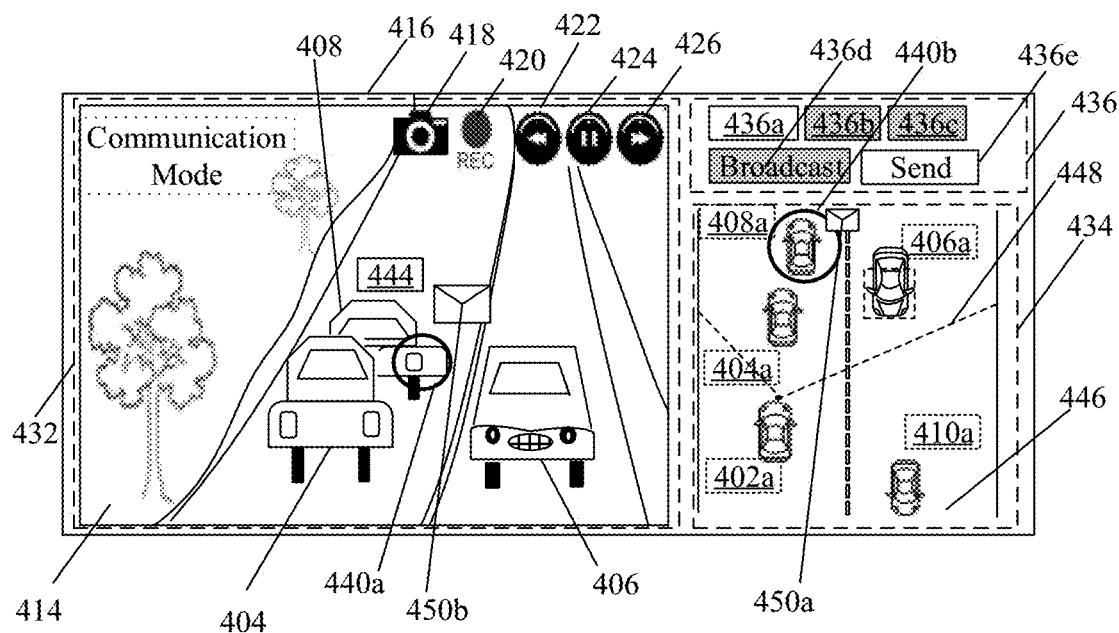

With reference to FIG. 4E, there is shown communication of the selected information item by use of the UI 416 in the communication mode. In accordance with an embodiment, after the selection of the UI element 436e, such as the "send" icon, the ECU 120 may be configured to communicate the selected information item, such as the first information item 436a, to the selected vehicle(s), such as the fourth car 408 in this case, via a wireless communication system of the first car 402. The ECU 120 may be configured to display an indication in each of the video stream area 432 and the digital model representation area 434 to depict completion of the sending operation, as shown by a message icon 450a in the digital model representation area 434 and another message icon 450b in the video stream area 432.

Figure 4F:
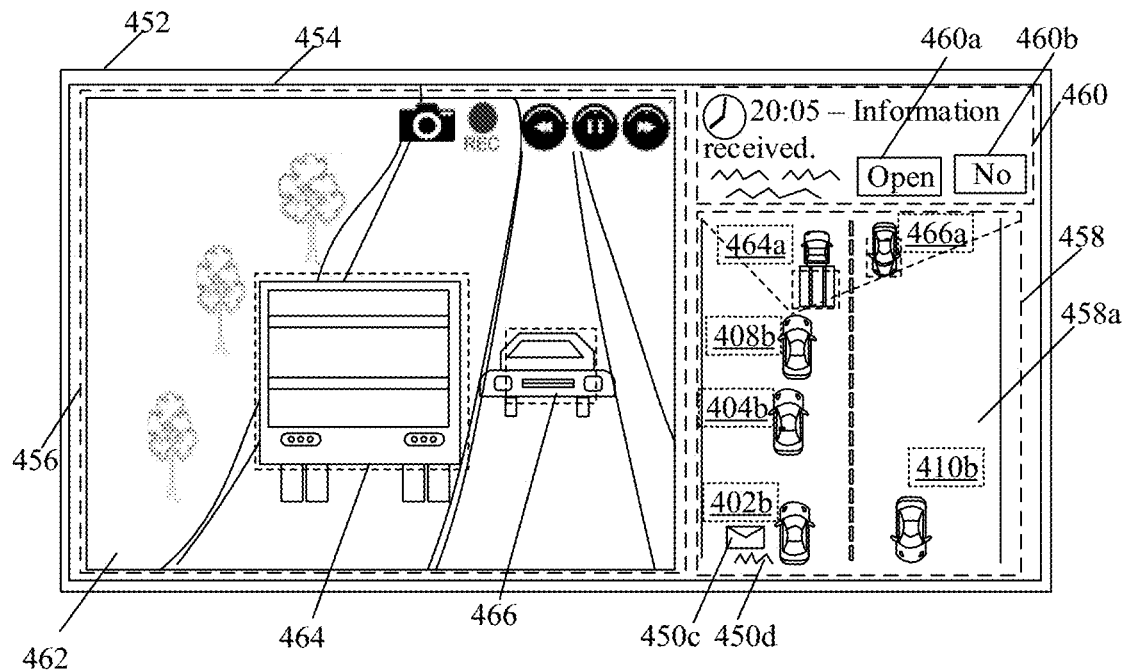

With reference to FIG. 4F, there is shown a display 452 at the fourth car 408. There is further shown a UI 454 rendered on the display 452. The UI 454 may include three display areas, such as a video stream area 456, a digital model representation area 458, and the information items area 460, similar to that of the video stream area 432, the digital model representation area 434, and the information items selection area 436 of the UI 416 as shown and described in FIG. 4C.

In the video stream area 456 of the UI 454, a video stream 462 captured by an image-capturing device of the fourth car 408 is displayed. Subsequent to receipt of the first information item 436a from the first car 402, an ECU of the fourth car 408 may be configured to display a message icon 450c near an icon 402b of a sender, such as the first car 402 in this case, in the generated digital model representation 458a. The placement of the message icon 450c near the icon 402b of the sender makes easy for the other driver 116 to identify one or more characteristics, such as current position, current lane, direction of travel, vehicle type, vehicle size, estimated distance of the sender (such as the first car 402 represented by an icon 402b) in relation to the fourth car 408 (represented by an icon 408b). Such one or more characteristics may be understood from a simple visual of the digital model representation 458a in the digital model representation area 458 of the UI 454.

In accordance with an embodiment, the received first information item 436a may be indicated in the information items area 460 of the UI 454. For example, received date and time, title of the information item 436a, such as "a fast moving object (a potential road hazard) detected at a blind spot behind the first car 402", and an inquiry, such as "Do you want to open the received information item?", to confirm if the information item 436a need to be opened and displayed in the information items area 460 of the UI 454 rendered on the display 452, as shown. Selectable icons of "Open" and "No" are displayed, as illustrated by the UI elements 460a and 460b. Based on the content of the received information item 436a, the ECU of the fourth car 408 may be configured to display an excerpt, such as "Blind spot information", of the received information item 436a on the digital model representation 458a, as illustrated by a UI element 450d.

Figure 4G:
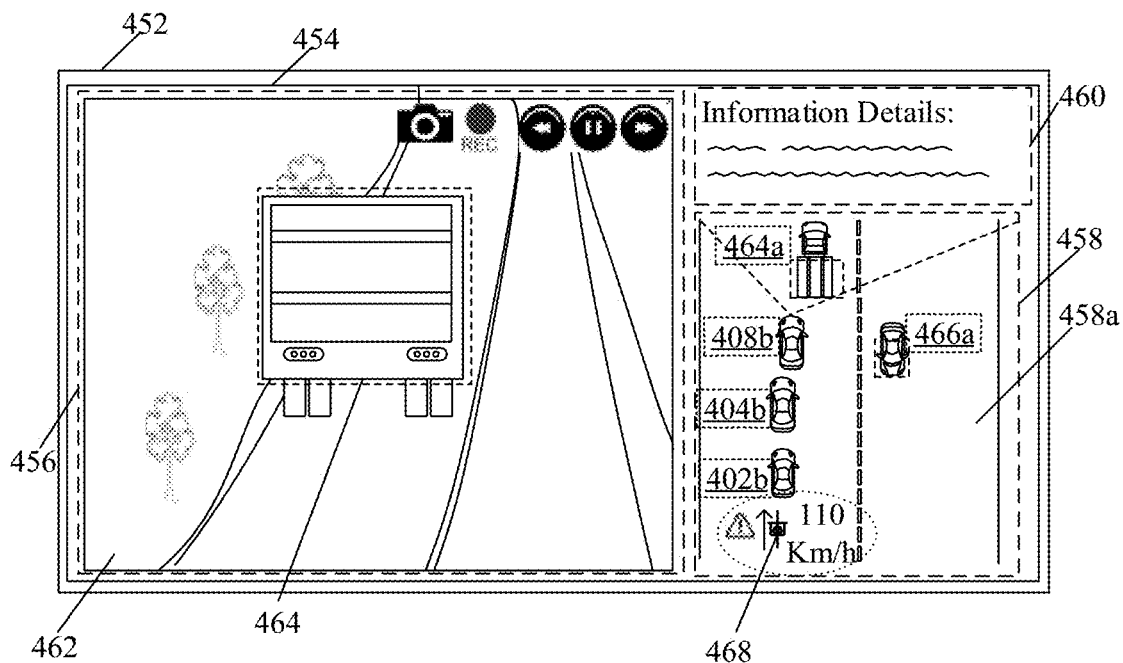

With reference to FIG. 4G, there is shown the UI 454 rendered on the display 452 of the fourth car 408 when the UI element 460a to open the message icon 450c is selected. When the user, such as the other driver 116, of the fourth car 408 selects the UI element 460a, such as the "open" icon, the ECU of the fourth car 408 may be configured to read and display entire content (details) of the information item 436a, as shown in the FIG. 4G. In accordance with an embodiment, and in this case, as the content of the received information item 436a include a position, speed, and driving direction of the potential road hazard, such as the motorcycle, an icon 468 to show an existence of the motorcycle, its speed and direction may be displayed in the digital model representation area 458 of the UI 454.

Figure 4H:
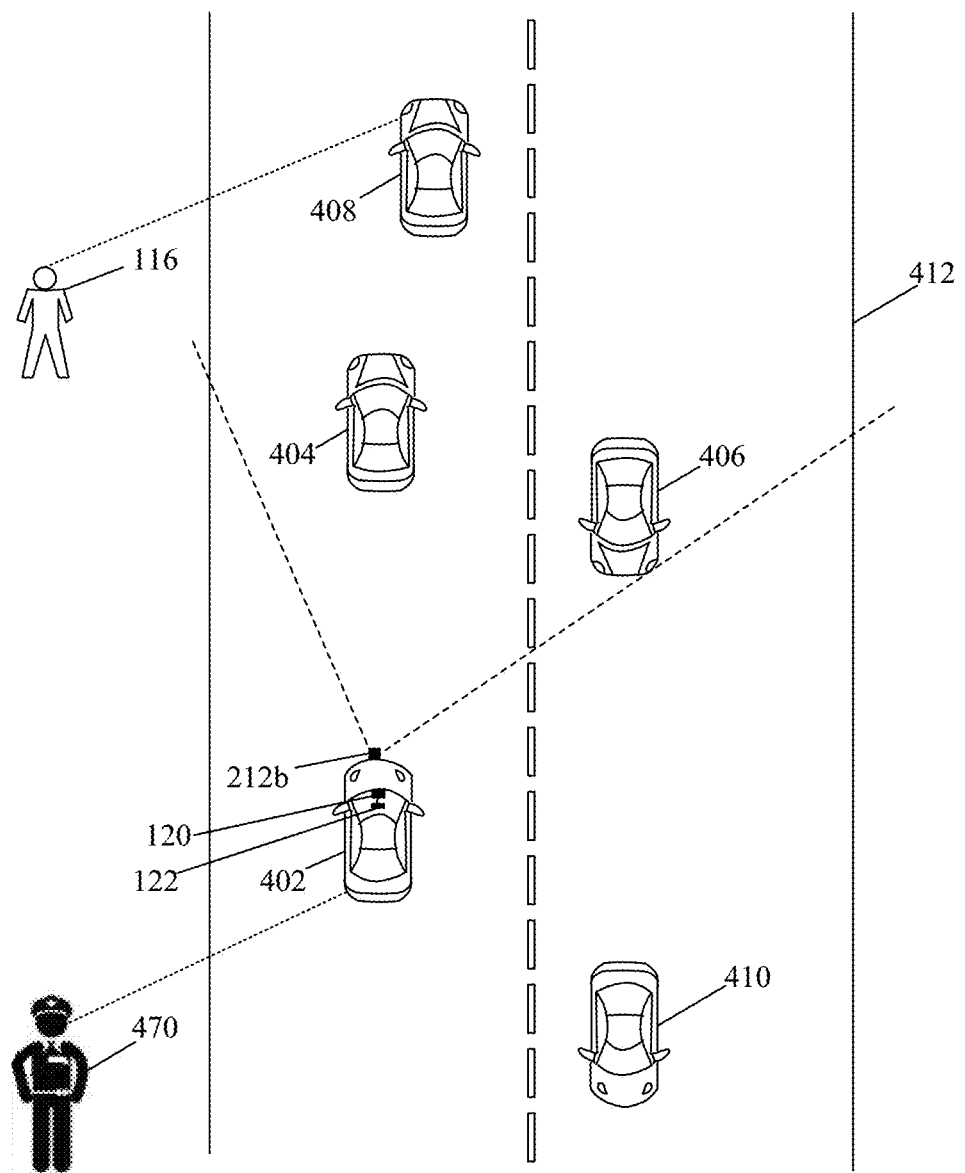
FIGS. 4H and 4I illustrate a second exemplary scenario for implementation of the disclosed system and method for communication of a message to a vehicle, in accordance with an embodiment of the disclosure.
Figure 4I:
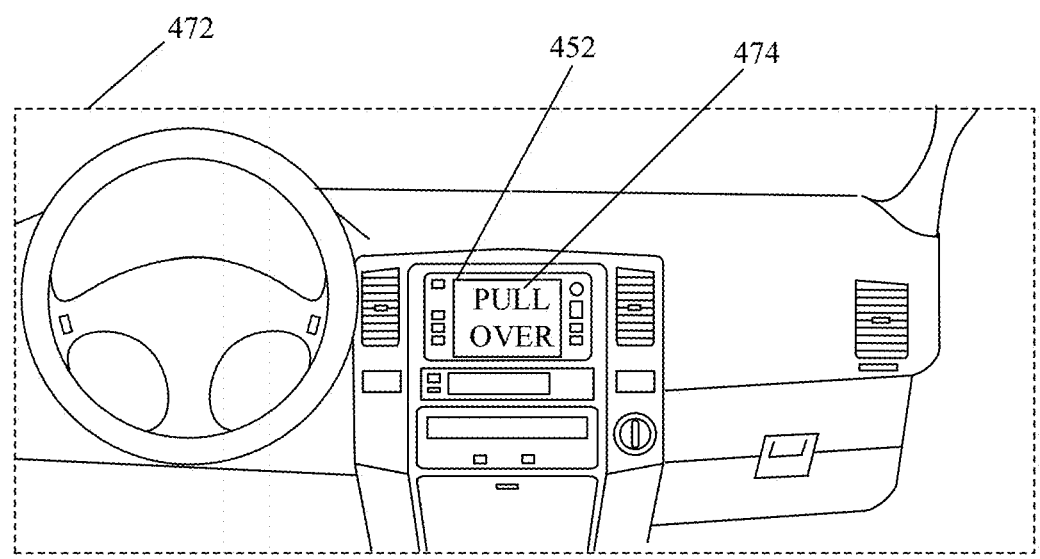

FIGS. 4H and 4I illustrate a second exemplary scenario for implementation of the disclosed system and method for communication of a message to a vehicle, in accordance with an embodiment of the disclosure. FIGS. 4H and 4I are explained in conjunction with elements from FIGS. 1, 2, 3, and 4A to 4G. With reference to FIG. 4H, instead of the driver 114 (of FIG. 4A), that may be a vehicle user, a traffic officer 470 may be associated with the first car 402 (such as a police car in the second exemplary scenario). There is also shown the second car 404, the third car 406, and the fourth car 408 that may traverse along the road portion 412 at a first time instant, similar to that as shown and described in FIG. 4A.

In accordance with the second exemplary scenario, the fourth car 408 may appear suspicious to the traffic officer 470. Thus, the traffic officer 470 may want to pull-over the fourth car 408. The traffic officer 470 may check whether the fourth car 408 is visible in the video stream displayed at the display device 122, via the UI 416. In instances when the fourth car 408 is visible on the display device 122, such as shown in FIG. 4B, the traffic officer 470 may provide a touch-based input to pause the displayed video stream by selecting the icon 424 by use of the UI 416 rendered on the display device 122. In instances when the fourth car 408 is not visible on the display device 122, the traffic officer 470 may provide one or more input actions to rewind or forward the video stream, by use of the icons 422 and 426 (FIG. 4B). The one or more input actions may be provided to find an image frame that comprises at least the vehicle which is to be pulled over, such as the fourth car 408. Alternatively, the input to pause, rewind, or forward the video stream may be voice-based input, such as "Pause Video" or "Rewind 2 seconds", and/or a gesture-based input. The image frame captured at a certain time instant, such as the first time instant, may comprise one or more vehicles (such as the second car 404 and the third car 406) in addition to the fourth car 408, as illustrated in FIG. 4B. The ECU 120 may be configured to receive the input provided to pause the displayed video stream. In other words, the received input may correspond to the selection of one (such as the image frame 414a (FIG. 4C) of the plurality of image frames from the video stream 414. The image frame 414a may be the selected image frame that corresponds to the first time instant.

In accordance with an embodiment, the ECU 120 may be configured to identify vehicle information associated with the one or more vehicles (such as the second car 404, the third car 406, and the fourth car 408) in the selected image frame. The identification of the vehicle information may occur based on the first time instant and a vehicle database that may be generated from the received datasets, as shown by highlighted marks 438a, 438b, 440a, and 440b displayed on the UI 416 in FIG. 4C.

Based on the identified vehicle information, the ECU 120 may be configured to generate and subsequently control display of the digital model representation 434a (as shown in FIG. 4C) of the one or more vehicles of the selected image frame on the display device 122 of the first car 402. The generated digital model representation 434a comprises a top view of the one or more vehicles in the FOV of the image-capturing unit 212b, at the first time instant. The top view may indicate an arrangement (as shown) of the one or more vehicles in the digital model representation 434a, based on the identified vehicle information.

In accordance with an embodiment, the ECU 120 may receive an input to select a representation, such as the icon 408a, of the fourth car 408 from the generated digital model representation 434a. The fourth car 408 may be a representation of the target vehicle 106, explained in FIG. 1. The fourth car 408 may be highlighted in the digital model representation 434a based on the received input, as shown in FIG. 4D. The traffic officer 470 may select a message, such as the information item 436a that may a "pull over message" in accordance with the second exemplary scenario, from the information items selection area 436, and press the UI element 436e to send the selected message. The ECU 120 may be configured to communicate the selected message, such as "PULL OVER", to the fourth car 408. In an instance, the generated digital model representation 434a may represent the one or more vehicles as graphical icons with corresponding unique vehicle identifiers. The unique vehicle identifiers, such as DSRCmsgID 324 (FIG. 3), may correspond to the vehicle information of each of the one or more vehicles, or the unique numbers, such as the numbers "1" and "2" (as shown in FIG. FIG. 4C). In such an instance, the traffic officer 470 may provide a voice command, such as "pull over vehicle <the unique identifier of fourth car 408>", to select the digital representation of the fourth car 408. Based on the voice command, a "PULL OVER" message may be communicated to the fourth car 408, thus reducing driving related risks.

In addition to such a message, the ECU 120 may be further configured to communicate a custom message. The custom message may provide additional information, such as a reason for the pull-over, to the fourth car 408. Examples of the custom message may include, but are not limited to, "You are speeding" and/or "You just changed lanes without a lane change indicator. The message and the custom message may be communicated to the fourth car 408, via the DSRC channel or the LTE protocol. The message icon 450a displayed in the digital model representation area 434, and the other message icon 450b displayed in the video stream area 432, indicates successful completion of the communication of the "PULL OVER" message intended for the fourth car 408.

In an instance, the object detection device 212a, such as RADAR device, may also be installed at the front side of the first car 402, in addition to the image-capturing unit 212b. In such an instance, the digital model representation 434a of the one or more vehicles may not be generated. Based on the identified vehicle information, the ECU 120 may be configured to control display of the plurality of image frames in the video stream at the display device 122, such that the one or more vehicles in the video stream is displayed with corresponding unique identifiers. For example, a first unique identifier "V2" or the unique number "1" may be displayed in the vicinity of the second car 404, a second unique identifier "V3" may be displayed in the vicinity of the third car 406, and a third unique identifier "V4" or the unique number "2" may be displayed in the vicinity of the fourth car 408. The traffic officer 470 may select an identifier of a target vehicle to which a message, such as the "PULL OVER", is to be communicated. For example, the traffic officer 470 may select the third unique identifier "V4" or the unique number "2" (as displayed) to communicate the message to the fourth car 408. The selection may be in response to a touch-based input or the voice command, such as "Pause video", "Rewind 2 seconds", or "PULL OVER V2" to further reduce risk while driving, as described above.

With reference to FIG. 4I, there is shown a cut section 472 of the fourth car 408 (that represents the target vehicle 106) and a graphical representation 474 of the pull-over message rendered at the display 452 of a head unit of the fourth car 408. An ECU of the fourth car 408 may be similar to the ECU 124 of the target vehicle 106. The ECU of the fourth car 408 may be configured to control provision of the received message at the head unit of the fourth car 408. In accordance with an embodiment, the ECU of the fourth car 408 may be configured to automatically control one or more components or systems, such as a body control module and a powertrain control system of the fourth car 408, when the fourth car 408 is in an autonomous operating mode. The one or more components or systems as mentioned above may be similar to the components or systems of the first car 402, as described in FIG. 2. Such auto control may occur to slow down and stop the fourth car 408 based on the received message, such as the "PULL OVER" message. Notwithstanding, any other suitable message may be displayed without limiting the scope of the disclosure. In accordance with an embodiment, when the fourth car 408 is not in the autonomous operating mode, a driver of the fourth car 408 may view the received message displayed at a display of the head unit. The driver may provide an input at the display of the head unit to communicate an acknowledgement to the first car 402.

Alternatively, an acknowledgement may be dynamically communicated to the first car 402 when the message is displayed at the fourth car 408. The communication of the acknowledgement to the first car 402 may be based on metadata, such as a unique identifier, that may be received from the first car 402, together with the pull-over message. In instances when a reduction in speed (deceleration) is not detected at the fourth car 408, a warning buzzer sound may further be produced to prompt a driver, such as the other driver 116, of the fourth car 408, to produce/follow a suitable action, such as to stop.

The ECU 120 of the first car 402 may be configured to receive the acknowledgement for the communicated message that indicates a confirmation of receipt of the pull-over message by the fourth car 408. In accordance with an embodiment, the acknowledgement may be received together with geospatial position (continuous or intermittent update of geospatial position) of fourth car 408. The fourth car 408 may then be tracked by a map service when the fourth car 408 does not stop as desired by the traffic officer 470. Thus, the various operations, as described above, makes possible a vehicle-specific targeted communication of messages, such as the pull-over message, to a target vehicle, such as the fourth car 408. The traffic officer 470 may be certain of the receipt of the message by the fourth car 408, based on the received acknowledgement.

Figure 5A:
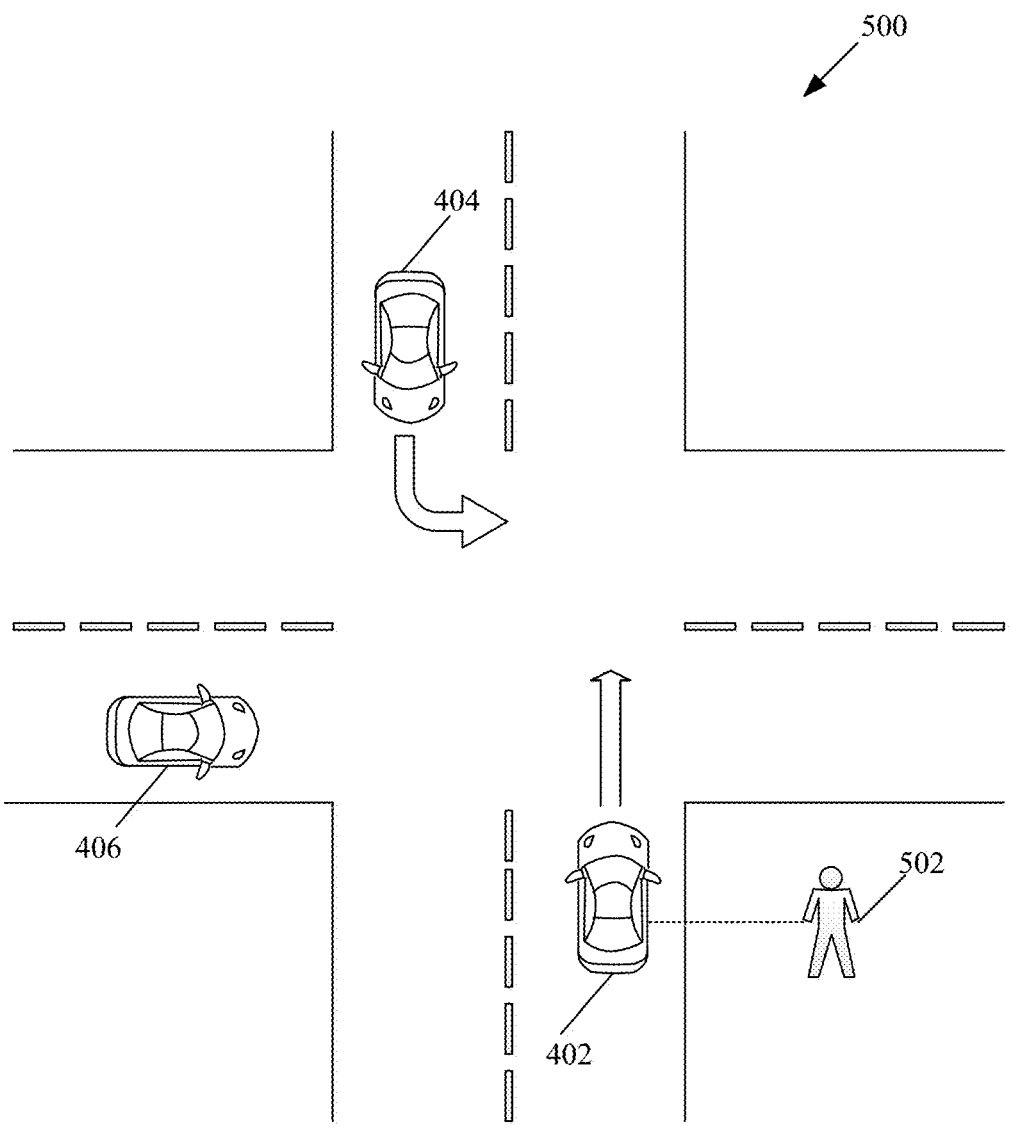
FIGS. 5A and 5B illustrate a third exemplary scenario for implementation of the disclosed system and method for communication of a message to a vehicle, in accordance with an embodiment of the disclosure.
Figure 5B:
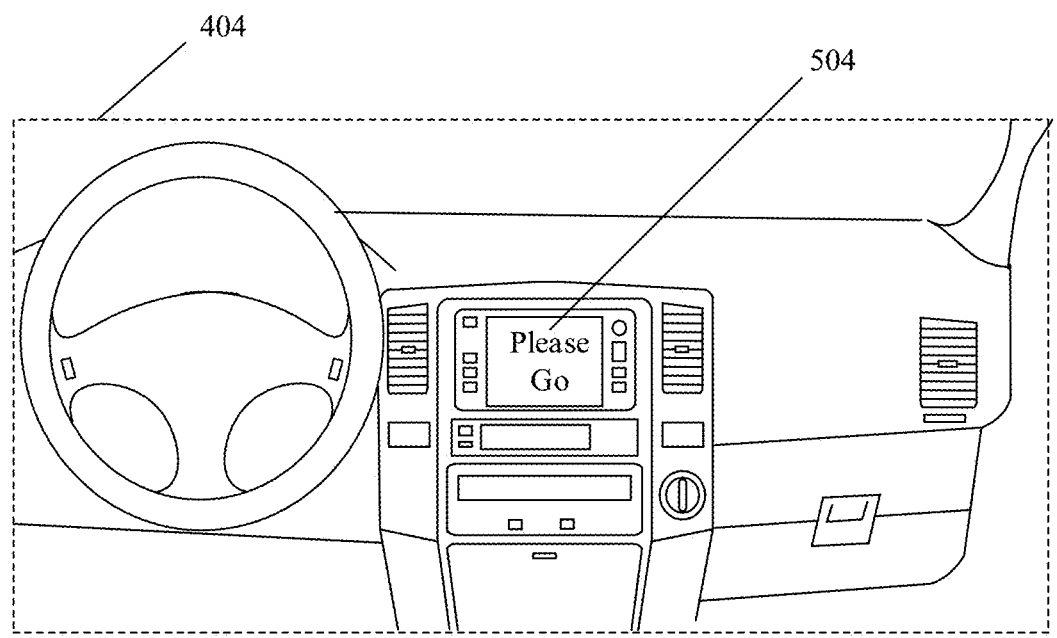

FIGS. 5A and 5B illustrate a third exemplary scenario for implementation of the disclosed system and method for communication of a message to a vehicle, in accordance with an embodiment of the disclosure. FIGS. 5A and 5B are explained in conjunction with elements from FIGS. 1, 2, 3, and 4A to 4I. With reference to FIG. 5A, there is shown a traffic scenario 500 that includes a plurality of vehicles, such as the first car 402, the second car 404, and the third car 406, in the vicinity of an uncontrolled road intersection.

In accordance with the third exemplary scenario, the first car 402 may be associated with a driver 502, instead of the driver 114. The ECU 120 of the first car 402 may be configured to control display of a plurality of images in a video stream on the display device 122 of the first car 402. The plurality of images of the video stream may be captured within the FOV of the image-capturing unit 212b. In absence of a traffic officer or a traffic light at a road intersection, the driver 502 of the first car 402 may want to communicate with a specific nearby vehicle, such as the second car 404, to safely pass along the road intersection.

The ECU 120 of the first car 402 may be configured to dynamically generate a digital model representation of one or more of the captured plurality of frames, based on a vehicle database. (The vehicle database may be generated in a manner similar to that described in FIGS. 2 and 3). The digital model representation, such as a top view, may be rendered simultaneously with the video stream on the UI 416 rendered on the display device 122 similar to that as shown and described in FIG. 4C.

The driver 502 may select the second car 404 in this case, from the rendered digital model representation at the display device 122, to establish a communication channel with the second car 404. The ECU 120 may be configured to render one or more pre-configured situational messages on the UI 416, in the information items selection area 436, at the display device 122. The ECU 120 may be configured to communicate the situational message, such as "Please go", to the second car 404, via the wireless communication network 112. In accordance with an embodiment, a custom message may be entered by the driver 502, such as "You move, I will wait—message from the red colored car in front of you" from the UI 416 on the display device 122.

With reference to FIG. 5B, there is shown a situational message 504 displayed at a display of a head unit of the second car 404. The driver 502 of the second car 404 may provide input to select the received situational message. The ECU of the second car 404 may be configured to communicate an acknowledgement of receipt of the situational message, in response to the selection. The color of the situational message 504 rendered on the display device of the first car 402 and the display of the second car 404 may be changed to indicate a confirmation of receipt of the situational message 504.

Figure 6:
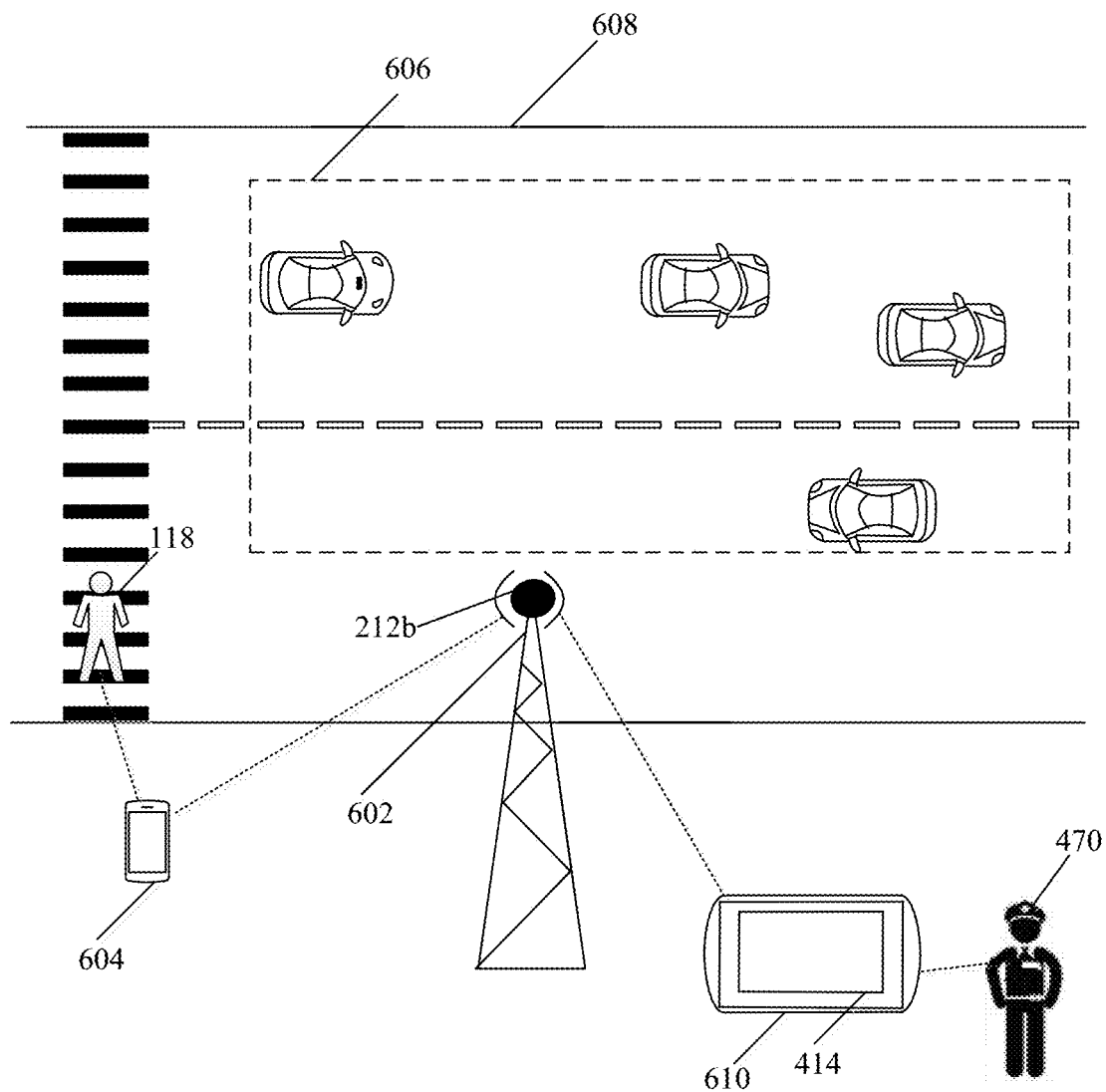
FIG. 6 illustrates a fourth exemplary scenario for implementation of the disclosed system and method for communication of a message to a vehicle and a pedestrian, in accordance with an embodiment of the disclosure.

FIG. 6 illustrates a fourth exemplary scenario for implementation of the disclosed system and method for communication of a message between a vehicle and a pedestrian, in accordance with an embodiment of the disclosure. FIG. 6 is explained in conjunction with elements from FIGS. 1, 2, and 3. With reference to FIG. 6, there is shown a road side unit (RSU) 602, a smartphone 604, a plurality of vehicles 606, a road portion 608, and a display device 610. The smartphone 604 may be associated with the pedestrian 118. The display device 610 may render the UI 416 and may be associated with the traffic officer 470.

In accordance with the fourth exemplary scenario, the display device 610 may correspond to the display device 122 (FIG. 1). The image-capturing unit 212b (FIG. 2) may be integrated with the RSU 602. The RSU 602 may be configured to receive a dataset from the smartphone 604 of the pedestrian 118 at a first time instant. The RSU 602 may further receive datasets from a plurality of vehicles 606, in the vicinity of the RSU 602, at one or more time instants. The image-capturing unit 212b of the RSU 602 may capture a video of the road portion 608 within the FOV of the image-capturing unit 212b.

The RSU 602 may be configured to generate a vehicle database associated with the road portion 608, based on the received datasets. The RSU 602 may be communicatively coupled with the plurality of vehicles 606, the smartphone 604, and the display device 610, for a time period. The time period may correspond to time when the plurality of vehicles 606 and the smartphone 604 are within a pre-defined communication range of the RSU 602.

In accordance with an embodiment, the display device 610 may be configured to receive a live video stream from the RSU 602. The display device 610 may be configured to control display of a plurality of image frames of the live video stream at the display device 610. In certain instances, the traffic officer 470 may observe that a pedestrian, such as the pedestrian 118, is crossing the road portion 608 in a manner that may amount to a traffic violation. In such instances, the traffic officer 470 may desire to communicate a traffic violation message to the smartphone 604 of the pedestrian 118. The traffic officer 470 may select one of the plurality of image frames displayed at the display device 610, by use of the UI 416 (as shown and described previously in FIGS. 4B to 4E). The selected one of the plurality of image frames at the first time instant may comprise one or more vehicles from the plurality of vehicles 606, and the pedestrian 118.

In accordance with an embodiment, the display device 610 may be configured to identify vehicle information associated with the one or more vehicles in the selected image frame. The display device 610 may be further configured to identify information associated with the smartphone 604 of the pedestrian 118. The identification of the vehicle information and the information associated with the smartphone 604, may occur by use of the generated vehicle database and the first time instant in a filter process (described in detail in FIG. 2). Based on the identified vehicle information and information associated with the smartphone 604, the display device 610 may be configured to generate a digital model representation (similar to that as shown in FIG. 4C) of the one or more vehicles and the pedestrian 118 in the selected one of the plurality of image frames.

In accordance with an embodiment, the traffic officer 470 may provide input to select a representation of the pedestrian 118 in the generated digital model representation. The one or more vehicles and the pedestrian 118 associated with the smartphone 604 in the generated digital model representation may be tagged with a unique identifier to establish communication with the display device 610. The display device 610 may then communicate a traffic violation message to the smartphone 604 of the pedestrian 118.

Similarly, the display device 610 may dynamically determine one or more target vehicles from the plurality of vehicles 606, based on the identified vehicle information. In an instance, the identified vehicle information may comprise vehicle speed values. In such an instance, the vehicle speed values of the one or more target vehicles may be compared to a threshold speed value. The threshold speed value may be associated with geospatial position of the image-capturing unit 212b to determine the speed limit. The threshold speed value may correspond to a pre-defined speed limit for the road portion 608, on which the image-capturing unit 212b may be situated.

The traffic officer 470 may communicate one or more traffic violation messages to the one or more target vehicles, by use of the UI 416 rendered on the display device 610. In accordance with an embodiment, the display device 610 may be configured to receive one or more input actions on the generated digital model representation, to simultaneously communicate one or more traffic violation messages to the one or more target vehicles.

Notwithstanding, the disclosure may not be so limited, and without deviating from the scope of the disclosure, the operations performed at the display device 610 may also be performed at the RSU 602. In such a case, the display device 610 may be utilized for final presentation of the output and receipt of input. Further, the RSU 602 may communicate the video data captured by the image-capturing unit 212b to a remote cloud server, such as the TMC for later use.

Figure 7A:
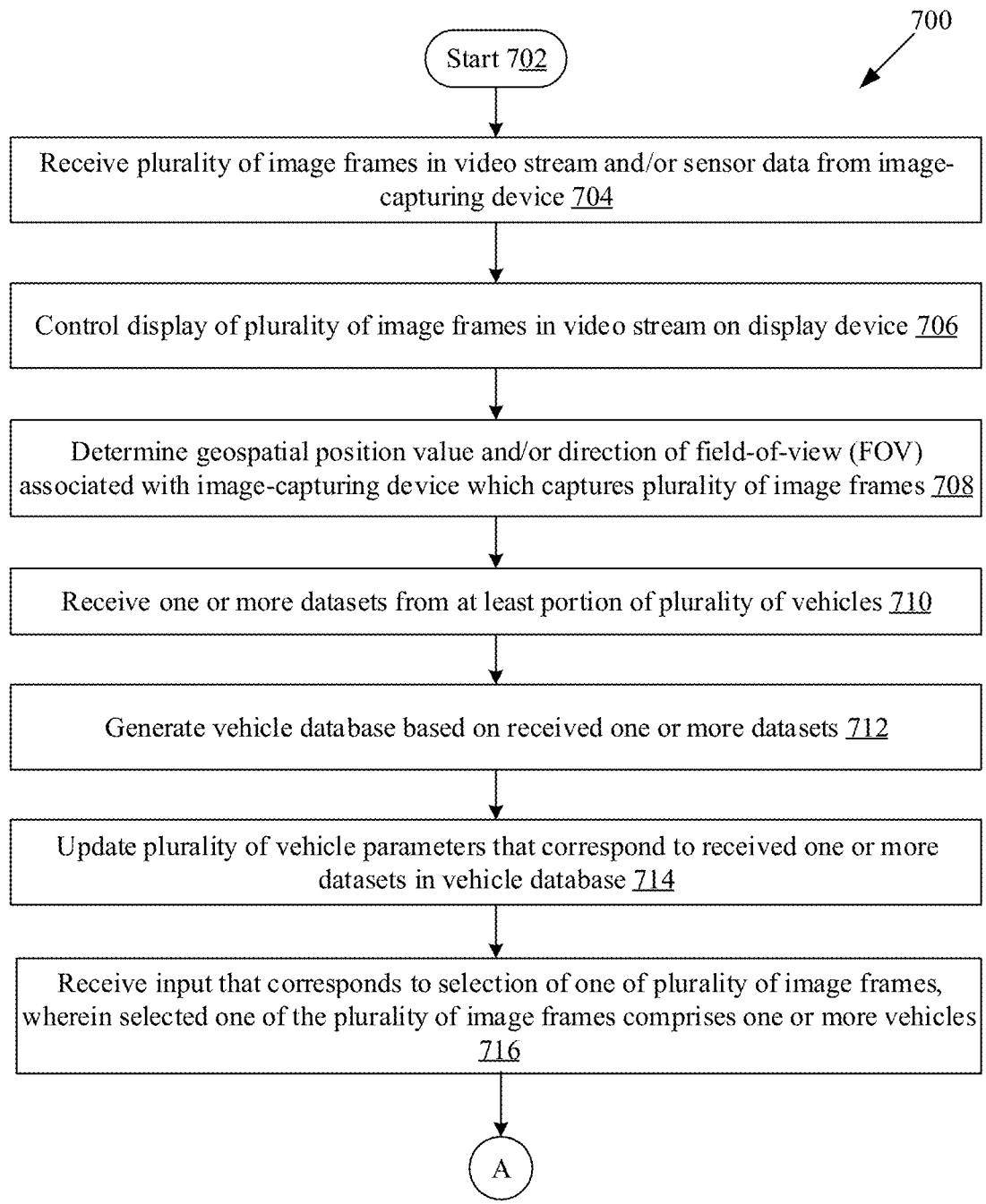
FIGS. 7A and 7B collectively depict a first flow chart that illustrates an exemplary method for communication of a message to a vehicle, in accordance with an embodiment of the disclosure.
Figure 7B:
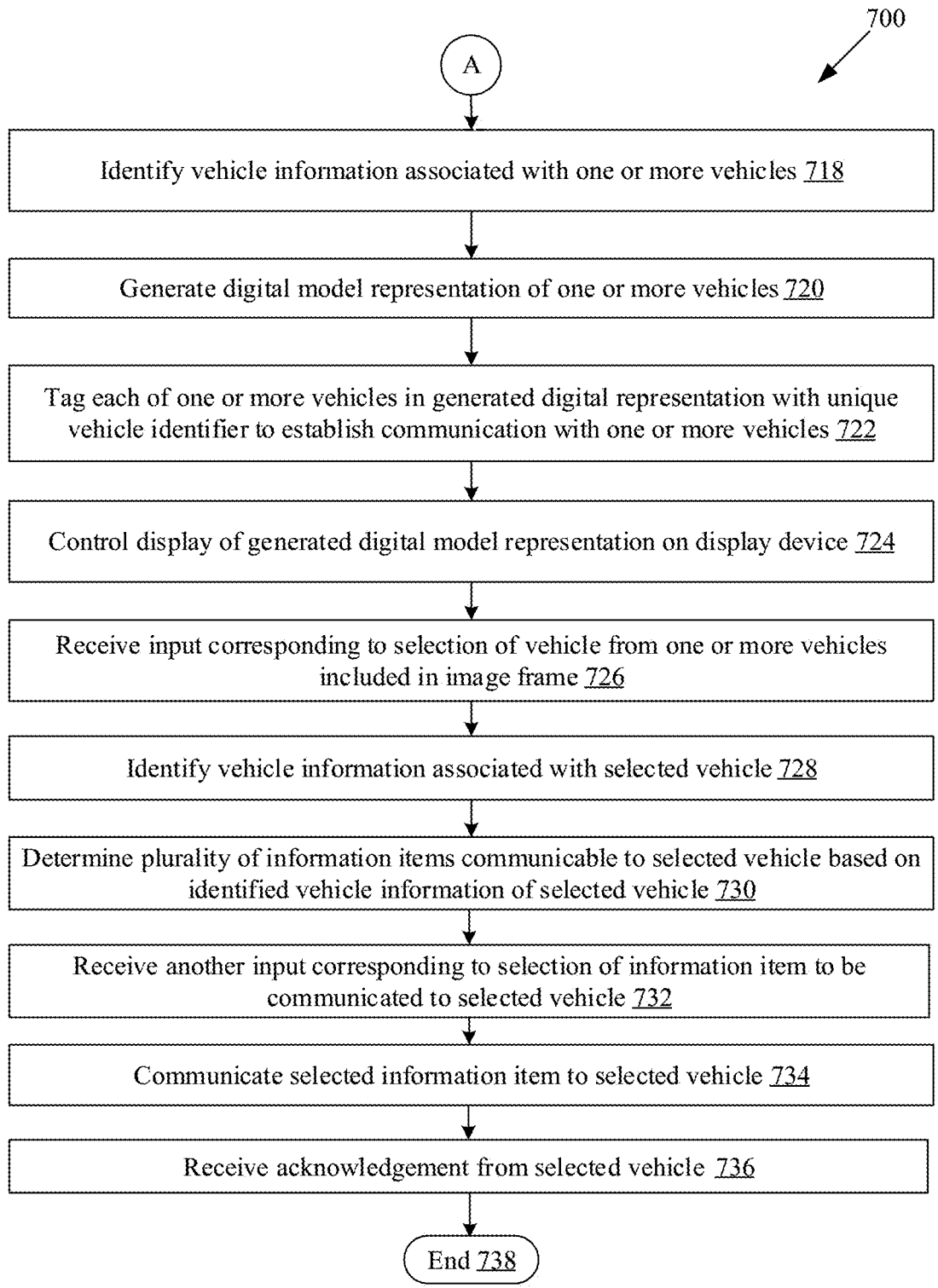

FIGS. 7A and 7B collectively depict a flow chart that illustrates an exemplary method for communication of a message to a vehicle, in accordance with an embodiment of the disclosure. With reference to FIGS. 7A and 7B, there is shown a flow chart 700. The flow chart 700 is described in conjunction with FIGS. 1, 2, 3, 4A to 4I, 5A, 5B, and 6. The method starts at step 702 and proceeds to step 704.

At step 704, a plurality of image frames in a video stream and/or sensor data may be received at the ECU 120. The video stream (such as the video stream 414 (FIG. 4B) and/or sensor data may be received from the image-capturing unit 212b. In accordance with an embodiment, the sensor data may be received from one or more other sensors, such as the object detection device 212a or the in-vehicle sensors, of the sensing system 212 (FIG. 2). The video stream may be a live stream of the traffic in a road portion (such as the road portion 412 (FIG. 4A), the road portion as shown in FIG. 5A, or the road portion 608 (FIG. 6)). In accordance with an embodiment, the ECU 120 may also receive time of capture of each frame of the plurality of image frames in the video stream from the image-capturing unit 212b. The received video stream may be stored at the memory 204, which may associate the time of capture information with each image frame during time of day.

At step 706, display of the plurality of image frames in the video stream may be controlled on the display device 122. In accordance with an embodiment, the display of the plurality of image frames may be controlled based on pre-set user preferences, such as preferences set by the driver 114. An example of the display of the plurality of image frames in the video stream, such as the video stream 414, is shown on the UI 416 in the FIG. 4B. The UI 416 may be rendered in a monitoring mode on the display device 122 that may be installed in a vehicle (such as the first vehicle 104 (FIG. 1) or the first car 402 (FIGS. 4A and 4B), as shown.

At step 708, a geospatial position value and/or a direction of the FOV associated with the image-capturing unit 212b, which captures the plurality of image frames, may be determined. An example of the direction of the FOV associated with the image-capturing unit 212b is represented by two divergent dotted lines from the image-capturing unit 212b, as shown in FIG. 4A. Another example of the direction of the FOV, such as the FOV 448 that may be represented on the UI 416, is shown in FIGS. 4C, 4D, and 4E.

At step 710, one or more datasets may be received from at least a portion of the plurality of vehicles 102. The one or more datasets may be received when the portion of the plurality of vehicles 102 are within the FOV of the image-capturing unit 212b that corresponds to one or more time instants. The one or more datasets may comprise vehicle information that may correspond to the plurality of vehicles 102 (such as the second car 404, the fourth car 408, and the fifth car 410, as shown and described in FIG. 4C, where the received datasets are represented by highlighted indicia on the UI 416) at the one or more time instants. For example, in FIG. 4C, the highlighted marks 438b and 438b and the unique numbers in the digital model representation area 434 may be similar to the highlighted marks 438a and 438a and unique numbers, such as the numbers "1" and "2", indicated on the video stream area 432 for easy recognition of the one or more vehicles included in the displayed image frame 414a from which the datasets are received. The fifth car 410, in the vicinity of the first car 402 from which a dataset is also received may also be indicated by a highlighted mark 446, and/or a unique number "3", as shown in the FIG. 4C.

In accordance with an embodiment, the one or more datasets may be received when the plurality of vehicles 102 pass along the road portion (such as the road portion 412 or the road portion 608) and are within a wireless communication range, such as the DSRC range, of the first vehicle 104, and/or the communication device 108 (such as the RSU 602 (FIG. 6)). The dataset includes a set of vehicle parameters that may correspond to vehicle information of a vehicle of the plurality of vehicles 102, as described in FIGS. 2 and 3.

At step 712, a vehicle database may be generated based on the received one or more datasets. In an example, the data structure of the vehicle database is described in detail in FIG. 3. At step 714, a plurality of vehicle parameters that correspond to the received one or more datasets may be updated in the vehicle database. Such an update may occur at the one or more time instants.

At step 716, input that corresponds to a selection of one of the plurality of image frames at a first time instant, may be received. The selected one of the plurality of image frames at the first time instant comprises one or more vehicles. For example, as shown in FIG. 4B, the icon 424 may be used to pause the video stream 414, such as to pause the video stream 414 to the displayed image. The driver 114 may identify a specific vehicle in the monitoring mode to which the driver 114 may desire to communicate. The driver 114 may select the icon 424 to pause the video stream 414 when the driver 114 identifies the specific vehicle in the monitoring mode (FIG. 4B). In response to the input the image frame 414a (FIG. 4C) may be selected, and the display mode of the UI 416 may be changed to a communication mode, as illustrated in FIG. 4C.

At step 718, vehicle information associated with the one or more vehicles at the first time instant may be identified. The identification may be based on filtering of the generated vehicle database. The filtering may occur based on a geospatial position value of the image-capturing unit 212b, the direction of the FOV of the image-capturing unit 212b, and/or geospatial information that corresponds to a boundary line of an area in the FOV at the first time instant. For example, the time of capture of the displayed image frame 414a (that also corresponds to the FOV of the image-capturing unit 212b at a particular time) of the video stream 414 may be the first time instant. Accordingly, at the first time instant the vehicles that were in the vicinity of the first car 402, and the vehicles from which the datasets were received may be filtered from the vehicle database based on the above described parameters. In this manner, the one or more vehicles in the image frame 414a, may be identified based on the time of capture of the selected image frame 414a. Further, at the first time instant, other vehicles and/or vehicle information may be identified from the sensor data received from the sensing system 212 at the first time instant. The filtering process has been described in detail in FIG. 2.

At step 720, a digital model representation of the one or more vehicles may be generated. The generated digital model representation may indicate the FOV of the image-capturing unit 212b at the first time instant, and may correspond to the selected one (such as the image frame 414a) of the plurality of image frames at the first time instant. An example of the digital model representation may be the digital model representation 434a, displayed on the UI 416, as shown in the FIG. 4C.

At step 722, each of the one or more vehicles in the generated digital model representation may be tagged with a unique vehicle identifier to establish communication with the one or more vehicles. An example of the unique vehicle identifiers tagged on the one or more vehicles may be the icons 402a, 404a, 406a, 408a, and 408a used as indications of the one or more vehicles, such as the first car 402, the second car 404, the third car 406, the fourth car 408, and the fifth car 410 respectively, as shown in the digital model representation area 434, displayed on the UI 416 in the FIGS. 4C, 4D, and 4E.

At step 724, display of the generated digital model representation on the display device 122 may be controlled. The generated digital model representation may comprise a top view of the one or more vehicles in the FOV of the image-capturing unit 212b, at the first time instant. In accordance with an embodiment, the top view may indicate an arrangement of the one or more vehicles in the generated digital model representation. The arrangement may occur based on the identified vehicle information. The arrangement may correspond to vehicle position, vehicle order in one or more lanes, and/or vehicle direction of travel at the first time instant. For example, in the FIG. 4C, the generated digital model representation 434a comprises a top view of the one or more vehicles in the FOV of the image-capturing unit 212b, at the first time instant. The top view may indicate an arrangement (as shown) of the one or more vehicles in the digital model representation 434a, based on the identified vehicle information.

At step 726, an input that corresponds to a selection of a vehicle (such as the target vehicle 106 (FIG. 1) or the fourth car 408 (FIG. 4F)) from the one or more vehicles included in the image frame, such as the image frame 414a, may be received. For example, as shown in FIG. 4D, the ECU 120 may be configured to receive input corresponding to selection of one or more vehicles from either the video stream area 432 or the digital model representation area 434. The fourth car 408 may be selected by use of the icon 408a of the UI 416. The fourth car 408 may be highlighted as indicated by the highlighted mark 440a (a highlighted indicia) in the video stream area 432 and the highlighted mark 440b in the digital model representation area 434, as shown in the FIG. 4D. Alternatively, a target vehicle from the one or more vehicles may be dynamically determined based on the identified vehicle information, such as a vehicle identified in high speed, or a vehicle with broken lights, and/or a vehicle in the wrong lane. In accordance with an embodiment, the target vehicle 106 from the one or more vehicles may be determined based on a user input that selects the target vehicle 106 from the displayed digital model representation, such as the displayed digital model representation 434a, at the display device 122.

At step 728, vehicle information associated with the selected vehicle may be identified. The identification of vehicle information associated with the selected vehicle may be based on the previously identified vehicle information associated with the one or more vehicles included in the selected image frame, such as the image frame 414a.

At step 730, a plurality of information items, such as the information items 436a, 436b, and 436c as shown and described in the FIGS. 4D and 4E, that may be communicated to the selected vehicle based on the identified vehicle information of the selected vehicle, may be determined. In accordance with an embodiment, display of the determined plurality of information items that are selectable by a user (such as the driver 114 or the traffic officer 470) on the display device 122, may be controlled. For example, display of the determined plurality of information items may be controlled in the information items selection area 436 of the UI 416, as shown and described in FIGS. 4D and 4E.

At step 732, another input that corresponds to a selection of an information item to be communicated to the selected vehicle, may be received at the ECU 120. For example, in the FIG. 4D, the first information item 436a may be selected by the user of the first car 402 via the UI 416 rendered on a display device, such as the display device 122, provided in the first car 402. The selected information item, such as the first information item 436a may be highlighted.

At step 734, the selected information item may be communicated to the selected vehicle (such as the target vehicle 106 (FIG. 1) or the fourth car 408 (FIG. 4F)). The selected information item that is communicated may be a pull-over message (as shown and described in FIGS. 4H and 4I), a traffic violation notice (as shown and described in FIG. 6), a custom message (as described in FIGS. 4H and 4I), and/or a situational message (such as the situational message 504, as shown and described in the FIG. 5B) to coordinate with the selected vehicle in a traffic condition. The information item may be communicated to the selected vehicle, via a wireless communication channel (such as the wireless communication network 112), one or more road side communication units (such as the communication device 108 (FIG. 1) or the RSU 602 (FIG. 6)), a cloud server (such as the TMC), or a dedicated short-range communication (DSRC) channel. For example, as shown in FIG. 4E, after the selection of the UI element 436e, such as the "send" icon, the ECU 120 may be configured to communicate the selected information item, such as the first information item 436a, to the selected vehicle(s), such as the fourth car 408, via a wireless communication system of the first car 402.

At step 736, an acknowledgement may be received from the selected vehicle. The acknowledgement may indicate a confirmation of receipt of the information item or message by the selected vehicle (such as the target vehicle 106 (FIG. 1) or the fourth car 408 (FIG. 4F)). Control passes to end step 738.

Figure 8:
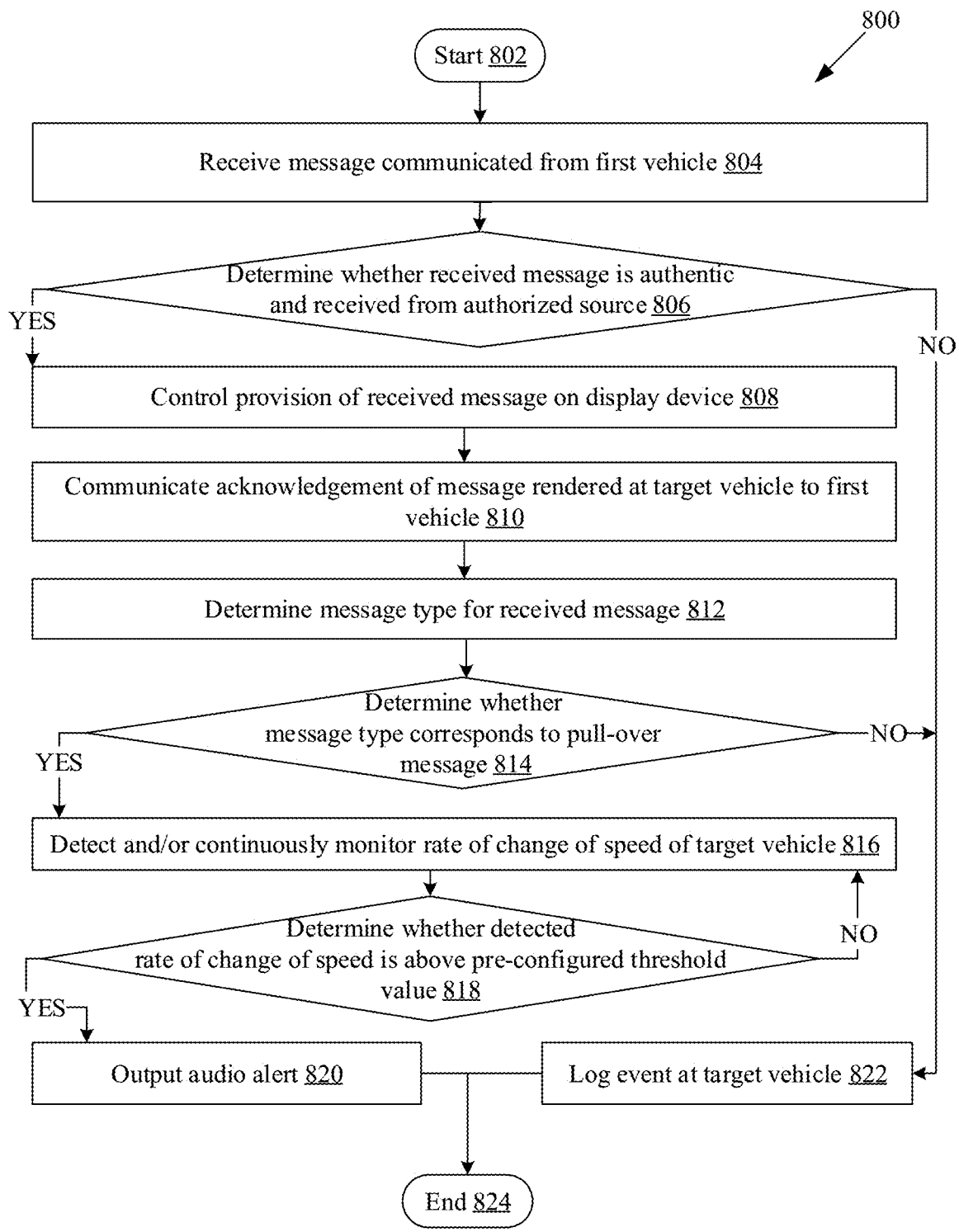
FIG. 8 depicts a second flow chart that illustrates another exemplary method for communication of a message to a vehicle, in accordance with an embodiment of the disclosure.

FIG. 8 is a second flow chart that illustrates another exemplary method for communication of a message to a vehicle, in accordance with an embodiment of the disclosure. With reference to FIG. 8, there is shown a flow chart 800. The flow chart 800 is described in conjunction with FIGS. 1, 2, 3, 4A to 4I, 5A, 5B, and 6. The method starts at step 802 and proceeds to step 804.

At step 804, a message communicated from a vehicle, such as the first vehicle 104, may be received. The message may be received by an ECU, such as the ECU 124, of the target vehicle 106 (such as the fourth car 408).

At step 806, it may be determined whether the received message is authentic and received from an authorized source, such as the first vehicle 104 associated with the driver 114. In instances when the received message is verified to be authentic and/or received from an authorized source, the control passes to step 808. In instances when the received message cannot be verified, or is verified to be unauthentic or unauthorized, the control passes to step 820.

At step 808, provision of the received message on a display device, such as the display 452 (FIGS. 4F and 4G) at the target vehicle 106, may be controlled. An example of the provision of the received message is shown in FIG. 4E. The received information or message, such as the received first information item 436a, may be indicated in the information items area 460 of the UI 454. Further, subsequent to receipt of the first information item 436a from the first car 402, an ECU of the fourth car 408 may be configured to display the message icon 450c near an icon 402b of a sender, such as the first car 402, in generated digital model representation 458a, as shown and described in FIG. 4E. When the user, such as the other driver 116, of the fourth car 408 selects the UI element 460a, such as the "open" icon, the ECU of the fourth car 408 may be configured to read and display entire content (details) of the information item 436a, as shown in the FIG. 4G.

At step 810, an acknowledgement of the message rendered at the target vehicle 106, may be communicated to the first vehicle 104. For example, as shown and described in FIG. 4I, the communication of the acknowledgement to the first car 402 may be based on metadata, such as a unique identifier, that may be received from the first car 402, together with the pull-over message.

At step 812, a message type for the received message may be determined. At step 814, it may be determined whether the message type corresponds to a pull-over message. In instances when the received message is determined to be a pull-over message, the control passes to step 816. In instances when the received message is not a pull-over message, the control passes to step 822. At step 816, a rate of change of speed of the target vehicle 106 may be detected and/or continuously monitored.

At step 818, it may be determined whether the detected rate of change of speed is above a pre-configured threshold value. In instances when the detected rate of change of speed is above the pre-configured threshold value, the control passes to step 820. In instances when the detected rate of change of speed is below the pre-configured threshold value, the control passes back to step 816 (until the target vehicle 106 stops).

At step 820, an audio alert may be outputted. The audio alert may be an additional alert to complement the displayed message, such as a visual alert. For example, as described in FIG. 4I, in instances when a reduction in speed (deceleration) is not detected at the fourth car 408, a warning buzzer sound may further be produced to prompt a driver, such as the other driver 116, of the fourth car 408, to produce/follow a suitable action, such as to stop. The control may pass to end step 824. At step 822, the received message may not be rendered, and the event may be logged at the target vehicle 106. The control may pass to end step 824.

In accordance with an embodiment of the disclosure, a system for communication of a message to a vehicle is disclosed. The system (such as the ECU 120 (FIG. 1) may comprise one or more circuits (hereinafter referred to as the microprocessor 202 (FIG. 2)). The microprocessor 202 may be configured to receive a video stream (such as the video stream 414). The microprocessor 202 may be configured to control display of a plurality of image frames in the video stream on the display device 122 (FIG. 1). The microprocessor 202 may be configured to receive vehicle information of one or more vehicles, included in an image frame (such as the image frame 414a) of the plurality of image frames, from the one or more vehicles via a wireless network (such as the wireless communication network 112 (FIG. 1)). The microprocessor 202 may be configured to receive a first input corresponding to a selection of a vehicle (such as the target vehicle 106 or the fourth car 408) from the one or more vehicles included in the image frame. The microprocessor 202 may be configured to identify vehicle information associated with the selected vehicle. The microprocessor 202 may be configured to receive a second input corresponding to a selection of an information item to be communicated to the selected vehicle. The microprocessor 202 may be configured to communicate the selected information item to the selected vehicle (such as the target vehicle 106 or the fourth car 408).

In accordance with an embodiment of the disclosure, a vehicle (such as the first vehicle 104 (FIGS. 1 and 2) or the first car 402 (FIGS. 4A to 4E)) is disclosed. The vehicle may comprise the battery 220. The vehicle may further comprise the ECU 120 (FIGS. 1 and 2). The ECU 120 may comprise one or more circuits (hereafter referred to as the microprocessor 202 (FIG. 2)) that may be communicatively coupled to the display device 122. The microprocessor 202 may be configured to receive a video stream (such as the video stream 414). The microprocessor 202 may be configured to control display of a plurality of image frames in the video stream on the display device 122 (FIG. 1). The microprocessor 202 may be configured to receive vehicle information of one or more vehicles, included in an image frame (such as the image frame 414*a*) of the plurality of image frames, from the one or more vehicles via a wireless network (such as the wireless communication network 112 (FIG. 1)). The microprocessor 202 may be configured to receive a first input corresponding to a selection of a vehicle (such as the target vehicle 106 or the fourth car 408) from the one or more vehicles included in the image frame. The microprocessor 202 may be configured to identify vehicle information associated with the selected vehicle. The microprocessor 202 may be configured to receive a second input corresponding to a selection of an information item to be communicated to the selected vehicle. The microprocessor 202 may be configured to communicate the selected information item to the selected vehicle (such as the target vehicle 106 or the fourth car 408).

Various embodiments of the disclosure may provide a non-transitory computer readable medium and/or storage medium, having stored thereon, a set of computer-executable instructions for causing a machine and/or a computer to communicate a message to a vehicle. The set of computer-executable instructions in an ECU, such as the ECU 120 (FIG. 1), may cause the machine and/or computer to perform the steps that comprise receipt of a video stream (such as the video stream 414). Display of a plurality of image frames in the received video stream on the display device 122 may be controlled. Vehicle information of one or more vehicles, included in an image frame of the plurality of image frames may be received from the one or more vehicles via a wireless network (such as the wireless communication network 112 (FIG. 1)). A first input that corresponds to a selection of a vehicle (such as the target vehicle 106 or the fourth car 408) from the one or more vehicles included in the image frame, may be received. Vehicle information associated with the selected vehicle may be identified. A second input that corresponds to a selection of an information item to be communicated to the selected vehicle, may be received. The selected information item may be communicated to the selected vehicle (such as the target vehicle 106 or the fourth car 408).

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system, comprising:
an image-capturing device configured to capture a video stream, wherein
said video stream comprises a plurality of image frames within a field-of-view of said image-capturing device,
said plurality of image frames include an image of each vehicle of a first plurality of vehicles, and
said plurality of image frames are captured in a corresponding time instant of a plurality of time instants;
one or more first circuits in a first electronic control unit of a first vehicle, wherein
said first electronic control unit is communicatively coupled to a first display device, and
said one or more first circuits are configured to:
receive said video stream and said plurality of time instants, from said image-capturing device;
control said first display device to display said plurality of image frames of said video stream;
receive first vehicle information associated with said first plurality of vehicles via a wireless network,
wherein a first image of at least one vehicle of said first plurality of vehicles is included in an image frame of said plurality of image frames;
generate a digital model representation of said at least one vehicle based on said first vehicle information,
wherein said digital model representation indicates said field-of-view of said image-capturing device at a first time instant of said plurality of time instants;
control said first display device to display said digital model representation;
receive a first input, on said first display device, corresponding to a selection of a second image of a second vehicle, wherein
said second image of said second vehicle is selected from at least one image of said at least one vehicle, and
said second image of said second vehicle is selected based on one of said video stream or said displayed digital model representation;
identify second vehicle information from said first vehicle information based on said first time instant corresponding to a time of capture of said image frame, wherein said second vehicle information is associated with said second vehicle;
receive a second input, on said first display device, corresponding to a selection of an information item of a plurality of information items that is communicable to said second vehicle; and communicate said information item to said second vehicle; and one or more second circuits in a second electronic control unit of said second vehicle, wherein said second electronic control unit is communicatively coupled to a second display device, and said one or more second circuits are configured to:

receive said information item from said first vehicle;

control said second display device to display said information item based on a verification of authenticity of said information item;

communicate an acknowledgement of said information item to said first vehicle;

determine a type of said information item;

detect a rate of change of speed of said first vehicle based on said determination that said type of said information item is a pull-over message; and output an audio alert based on said rate of change of speed that is greater than a threshold value.

2. The system according to claim 1, wherein said first display device is installed in at least one of said first vehicle, a traffic monitoring center (TMC), or a portable display device, and said traffic monitoring center (TMC) monitors traffic of a road portion.

3. The system according to claim 1, wherein said first input is a touch operation on said second image that is displayed on said first display device.

4. The system according to claim 1, wherein said one or more first circuits are further configured to:

determine said plurality of information items based on said second vehicle information of said second vehicle; and control display of said plurality of information items on said first display device.

5. The system according to claim 4, wherein said one or more first circuits are further configured to control said first display device to display concurrently said video stream and said digital model representation, said digital model representation further indicates relative position of said first plurality of vehicles with respect to said first vehicle, said one or more first circuits are further configured to display highlighted indicia adjacent to each of said second image of said second vehicle in said video stream and a third image in said digital model representation, based on a touch input on said second image of said second vehicle, and said third image is a corresponding image of said second vehicle in said digital model representation.

6. The system according to claim 1, wherein said one or more first circuits are further configured to receive a third input corresponding to a selection of said image frame of said plurality of image frames at a second time instant of said plurality of time instants.

7. The system according to claim 1, wherein said one or more first circuits are further configured to determine at least one of a geospatial position value of said image-capturing device or a direction of said field-of-view of said image-capturing device.

8. The system according to claim 7, wherein said second vehicle information corresponds to at least one of a unique vehicle identifier, a vehicle position, a vehicle size, a direction of travel, a vehicle speed value, a steering angle, a vehicle positional accuracy data, a brake system status, a status of a vehicle stability system, yaw rate, said rate of change of speed, or lane information.

9. The system according to claim 8, wherein said one or more first circuits are further configured to:

filter said second vehicle information based on at least one of said geospatial position value of said image-capturing device, said direction of said field-of-view of said image-capturing device, geospatial information, or at least one threshold value, wherein said geospatial information corresponds to a boundary line of an area in said field-of-view at a second time instant of said plurality of time instants; and determine a target vehicle from said at least one vehicle based on said filtered second vehicle information.

10. The system according to claim 1, wherein said digital model representation comprises a top view of said at least one vehicle that is in said field-of-view of said image-capturing device at said first time instant of said plurality of time instants.

11. The system according to claim 10, wherein said top view indicates an arrangement of said at least one vehicle in said digital model representation, said arrangement of said at least one vehicle corresponds to at least one of vehicle position, vehicle ordering in at least one lane, or vehicle direction of travel at said first time instant, and said arrangement is based on said second vehicle information.

12. The system according to claim 10, wherein said one or more first circuits are further configured to:

tag said at least one vehicle in said digital model representation with a unique vehicle identifier; and communicate with said at least one vehicle based on said tag.

13. The system according to claim 10, wherein said one or more first circuits are further configured to determine a target vehicle, from said at least one vehicle, based on said selection of said second image of said second vehicle, and said second image of said second vehicle is selected, from said displayed digital model representation at said first display device, based on a user input.

14. The system according to claim 1, wherein said one or more first circuits are further configured to receive at least one dataset corresponding to a second plurality of vehicles of said first plurality of vehicles, said at least one dataset is received based on said second plurality of vehicles are within said field-of-view of said image-capturing device, and said image of each vehicle of said second plurality of vehicles are captured within said field-of-view of said image-capturing device corresponding to at least one time instant of said plurality of time instants.

15. The system according to claim 14, wherein said one or more first circuits are further configured to generate a vehicle database based on said at least one dataset.

16. The system according to claim 15, wherein said digital model representation is generated based on said vehicle database.

17. The system according to claim 15, wherein said one or more first circuits are further configured to update a plurality of vehicle parameters, in said vehicle database, at said at least one time instant, and said plurality of vehicle parameters correspond to said at least one dataset.

18. The system according to claim 15, wherein said one or more first circuits are further configured to:
filter said vehicle database based on at least one of a geospatial position value of said image-capturing device, a direction of said field-of-view of said image-capturing device, or geospatial information that is corresponding to a boundary line of an area in said field-of-view at a second time instant of said plurality of time instants; and
identify third vehicle information, associated with said at least one vehicle at said second time instant, based on said filtered vehicle database.

19. The system according to claim 1, wherein
said information item is at least one of said pull-over message, a traffic violation notice, a custom message, or a situational message, and
said information item is communicated to coordinate with said second vehicle in a traffic condition.

20. The system according to claim 1, wherein said information item is communicated to said second vehicle via at least one of a wireless communication channel, road side communication units, a cloud server, or a dedicated short-range communication (DSRC) channel.

21. A method, comprising:
in a first electronic control unit of a first vehicle, wherein said first electronic control unit is communicatively coupled to a first display device:
receiving a video stream and a plurality of time instants for each image frame of a plurality of image frames, from an image-capturing device, wherein
said video stream comprises said plurality of image frames within a field-of-view of said image-capturing device,
said plurality of image frames include an image of each vehicle of a plurality of vehicles, and
said plurality of image frames are captured in a corresponding time instant of said plurality of time instants;
controlling said first display device to display said plurality of image frames of said video stream;
receiving first vehicle information associated with said plurality of vehicles via a wireless network,
wherein a first image of at least one vehicle of said plurality of vehicles is included in an image frame of said plurality of image frames;
generating a digital model representation of said at least one vehicle based on said first vehicle information,
wherein said digital model representation indicates said field-of-view of said image-capturing device at a time instant of said plurality of time instants;
controlling said first display device to display said digital model representation;
receiving a first input, on said first display device, corresponding to a selection of a second image of a second vehicle, wherein
said second image of said second vehicle is selected from at least one image of said at least one vehicle, and
said second image of said second vehicle is selected based on one of said video stream or said displayed digital model representation;
identifying second vehicle information from said first vehicle information based on said time instant corresponding to a time of capture of said image frame, wherein said second vehicle information is associated with said second vehicle;
receiving a second input, on said first display device, corresponding to a selection of an information item of a plurality of information items that is communicable to said second vehicle; and
communicating said information item to said second vehicle; and
in a second electronic control unit of said second vehicle, wherein said second electronic control unit is communicatively coupled to a second display device:
receiving said information item from said first vehicle;
controlling said second display device to display said information item based on a verification of authenticity of said information item;
communicating an acknowledgement of said information item to said first vehicle;
determining a type of said information item;
detecting a rate of change of speed of said first vehicle based on said determination of said type of said information item is a pull-over message; and
outputting an audio alert based on said rate of change of speed that is greater than a threshold value.

22. A first vehicle, comprising:
a battery;
an electronic control unit coupled to a first display device; and
one or more circuits in said electronic control unit, wherein said one or more circuits are configured to:
receive, a video stream and a plurality of time instants for each image frame of a plurality of image frames, from an image-capturing device, wherein
said video stream comprises said plurality of image frames within a field-of-view of said image-capturing device,
said plurality of image frames include an image of each vehicle of a plurality of vehicles, and
said plurality of image frames are captured in a corresponding time instant of said plurality of time instants;
control said first display device to display said plurality of image frames of said video stream;
receive first vehicle information associated with said plurality of vehicles via a wireless network,
wherein a first image of at least one vehicle of said plurality of vehicles is included in an image frame of said plurality of image frames;
generate a digital model representation of said at least one vehicle based on said first vehicle information,
wherein said digital model representation indicates said field-of-view of said image-capturing device at a time instant of said plurality of time instants;
control said first display device to display said digital model representation;
receive a first input, on said first display device, corresponding to a selection of a second image of a second vehicle, wherein
said second image of said second vehicle is selected from at least one image of said at least one vehicle, and
said second image of said second vehicle is selected based on one of said video stream or said displayed digital model representation;
identify second vehicle information from said first vehicle information based on said time instant corresponding to a time of capture of said image frame, wherein said second vehicle information is associated with said second vehicle;

receive a second input, on said first display device, corresponding to a selection of an information item of a plurality of information items that is communicable to said second vehicle;

communicate said information item to said second vehicle, wherein said information item is received by said second vehicle, said information item is displayed by a second display device coupled to said second vehicle based on a verification of authenticity of said information item; and receive an acknowledgement of said information item from said first vehicle, wherein a type of said information item is determined by said second vehicle, a rate of change of speed of said first vehicle is detected by said second vehicle based on said determination that said information item is a pull-over message; and an audio alert is outputted by said second vehicle based on said rate of change of speed that is greater than a threshold value.

23. A non-transitory computer-readable medium having stored thereon, computer-executable instructions, which when executed by a computer, cause said computer to execute operations, said operations comprising:

in a first electronic control unit of a first vehicle communicatively coupled to a first display device:

receiving a video stream and a plurality of time instants for each image frame of a plurality of image frames, from an image-capturing device, wherein said video stream comprises said plurality of image frames within a field-of-view of said image-capturing device, said plurality of image frames include an image of each vehicle of a plurality of vehicles, and said plurality of image frames are captured in a corresponding time instant of said plurality of time instants;

controlling said first display device to display said plurality of image frames of said video stream;

receiving first vehicle information associated with said plurality of vehicles via a wireless network, wherein a first image of at least one vehicle of said plurality of vehicles is included in an image frame of said plurality of image frames;

generating a digital model representation of said at least one vehicle based on said first vehicle information, wherein said digital model representation indicates said field-of-view of said image-capturing device at a time instant of said plurality of time instants;

controlling said first display device to display said digital model representation;

receiving a first input, on said first display device, corresponding to a selection of a second image of a second vehicle, wherein said second image of said second vehicle is selected from at least one image of said at least one vehicle, and said second image of said second vehicle is selected based on one of said video stream or said displayed digital model representation;

identifying second vehicle information from said first vehicle information based on said time instant corresponding to a time of capture of said image frame, wherein said second vehicle information is associated with said second vehicle;

receiving a second input, on said first display device, corresponding to a selection of an information item of a plurality of information items that is communicable to said second vehicle; and communicating said information item to said second vehicle; and in a second electronic control unit of said second vehicle, wherein said second electronic control unit is communicatively coupled to a second display device:

receiving said information item from said first vehicle;

controlling said second display device to display said information item based on a verification of authenticity of said information item;

communicating an acknowledgement of said information item to said first vehicle;

determining a type of said information item;

detecting a rate of change of speed of said first vehicle based on said determination of said type of said information item is a pull-over message; and outputting an audio alert based on said rate of change of speed that is greater than a threshold value.

* * * * *